US012164247B2

(12) United States Patent
Matsumoto et al.

(10) Patent No.: US 12,164,247 B2
(45) Date of Patent: Dec. 10, 2024

(54) IMAGE FORMING APPARATUS

(71) Applicant: CANON KABUSHIKI KAISHA, Tokyo (JP)

(72) Inventors: Norihiro Matsumoto, Tokyo (JP); Akinori Mitsumata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/133,268

(22) Filed: Apr. 11, 2023

(65) Prior Publication Data

US 2023/0341793 A1 Oct. 26, 2023

(30) Foreign Application Priority Data

Apr. 25, 2022 (JP) ................................ 2022-071903

(51) Int. Cl.
*G03G 15/16* (2006.01)

(52) U.S. Cl.
CPC .................................. *G03G 15/161* (2013.01)

(58) Field of Classification Search
CPC .................................................... G03G 15/161
See application file for complete search history.

(56) References Cited

U.S. PATENT DOCUMENTS 4,502,779 A * 3/1985 Kajita ................ G03G 21/0029 399/351
9,298,139 B2 3/2016 Suzuki et al.
2007/0003317 A1* 1/2007 Masuda ............. G03G 21/0029 399/101

FOREIGN PATENT DOCUMENTS

JP 2012-103339 A 5/2012
JP 2012-155101 A 8/2012
JP 2015-191104 A 11/2015

* cited by examiner

*Primary Examiner* — Stephanie E Bloss
*Assistant Examiner* — Michael A Harrison
(74) *Attorney, Agent, or Firm* — Venable LLP

(57) ABSTRACT

Provided is an image forming apparatus including a blade moving mechanism that can inhibit a blade from moving from a retracted position to a contact position even when an external force is exerted. The image forming apparatus includes an image bearing member that bears a developer image, a transfer belt to which the developer image is transferred, the blade that comes into contact with the transfer belt to collect a developer, a rotating member that rotates to act on the blade and move the blade between the contact position, where the blade contacts the transfer belt, and the retracted position, where the blade is away from the transfer belt, and a regulating member that regulates movement of the blade, which has moved from the contact position to the retracted position, from the retracted position to the contact position.

15 Claims, 20 Drawing Sheets

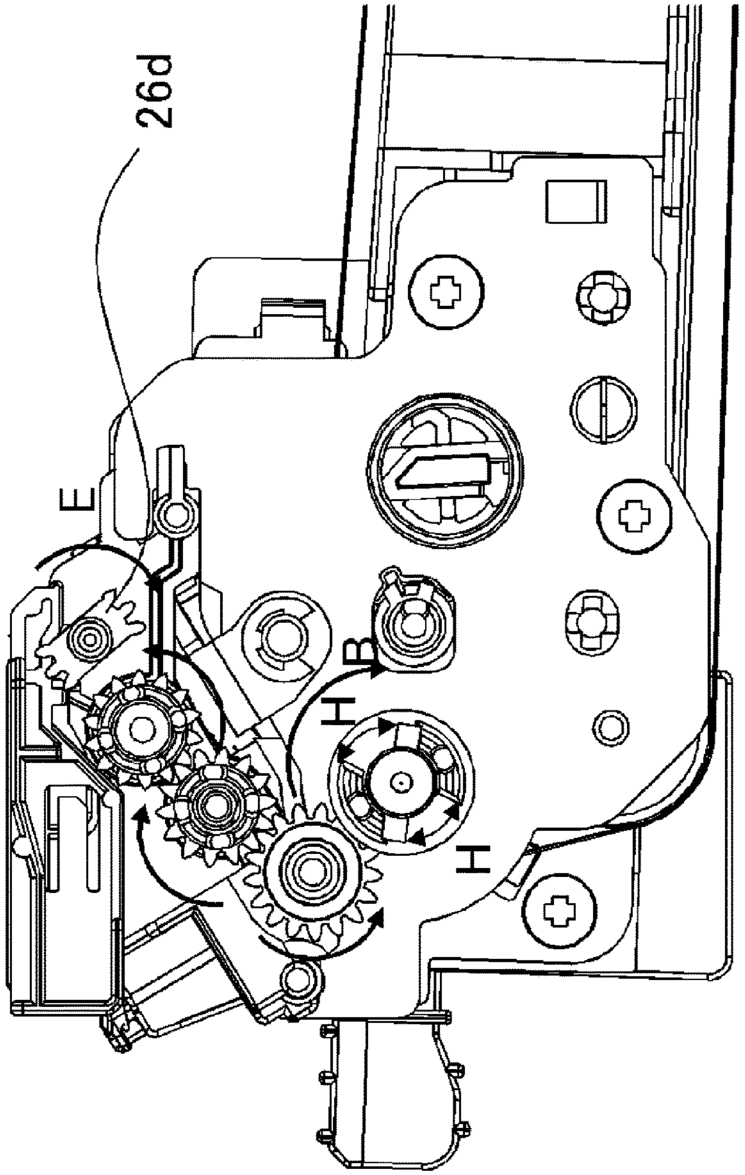
Fig.6C
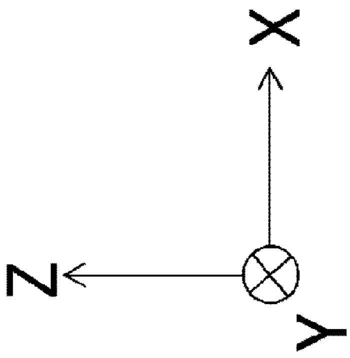

IMAGE FORMING APPARATUS

BACKGROUND OF THE INVENTION

Field of the Invention

The present invention relates to an image forming apparatus.

Description of the Related Art

In an image forming apparatus in which a toner image is transferred onto a transfer belt, a cleaning means is provided to remove a residual toner remaining on the transfer belt after the toner is transferred to a transfer material. As a member that removes the residual toner, a blade made of rubber or the like is used. The blade is pressed against the transfer belt by a spring or the like to come into contact with a surface of the transfer belt and collect the toner on the transfer belt, thereby removing the residual toner on the transfer belt. The removed residual toner is temporarily collected into a cleaner container provided in the cleaning means. The collected residual toner is transported by a transport member included in the cleaner container to be discharged into an external container.

Since the blade is constantly under a force applied by the spring or the like in a direction of contact with the transfer belt, when not used for a long period during, for instance, transportation or storage, the blade may be plastically deformed under the influence of an ambient temperature or a humidity. When the blade is plastically deformed, a position of contact with the transfer belt may deviate from an appropriate position or a manner, in which the blade warps, may change, and so forth to possibly degrade residual toner removal performance.

Japanese Patent Application Publication No. 2015-191104 describes a technology in which a transfer belt is provided with a moving member that moves a blade from a contact position, where the blade is in contact with a transfer belt, to a retracted position, where the blade is apart from the transfer belt, and a user operates the moving member to be able to move the blade to the retracted position. The moving member is configured to include a rotating member having a cam that allows a force in a direction of moving the blade away from the transfer belt against a force of a spring to be exerted, according to a rotation angle, on a holding member that holds the blade. The user operates a lever provided in the rotating member to rotate the rotating member to bring the cam into contact with the holding member and thereby move the blade to the retracted position. During transportation or storage, the user operates the lever to move the blade to the retracted position, and can thus inhibit the blade from being deformed.

SUMMARY OF THE INVENTION

The rotating member in Japanese Patent Application Publication No. 2015-191104 is connected to a gear train to which rotation of a stretching roller that stretches the transfer belt is transmitted, and is configured such that a rotational drive force input to the stretching roller during use of an image forming apparatus is transmitted to the rotating member. Accordingly, as a result of the rotation of the rotating member to a position where the cam is not in contact with the holding member during the use of the image forming apparatus, the blade automatically moves from the retracted position to the contact position. Since the rotating member is integrally provided with the lever to be operated, when an external force is exerted on the lever during transportation or by handling of the apparatus, the blade may unintentionally move from the retracted position to the contact position. Therefore, an object of the present invention is to provide an image forming apparatus including a blade moving mechanism capable of inhibiting a blade from moving from a retracted position to a contact position even when an external force is exerted.

An image forming apparatus according to the present invention comprising:

- an image bearing member that bears a developer image;
- a transfer belt to which the developer image is transferred from the image bearing member;
- a blade that that comes into contact with the transfer belt to collect a developer remaining on the transfer belt;
- a rotating member that rotates to act on the blade and moves the blade between a contact position, where the blade contacts the transfer belt, and a retracted position, where the blade is away from the transfer belt; and
- a regulating member that regulates movement of the blade, which has moved from the contact position to the retracted position, from the retracted position to the contact position.

According to the present invention, it is possible to provide an image forming apparatus including a blade moving mechanism capable of inhibiting a blade from moving from a retracted position to a contact position even when an external force is exerted.

Further features of the present invention will become apparent from the following description of exemplary embodiments with reference to the attached drawings.

BRIEF DESCRIPTION OF THE DRAWINGS

FIG. 6C is a side view illustrating the operation of the blade moving mechanism in the first embodiment;

DESCRIPTION OF THE EMBODIMENTS

Figure 1:
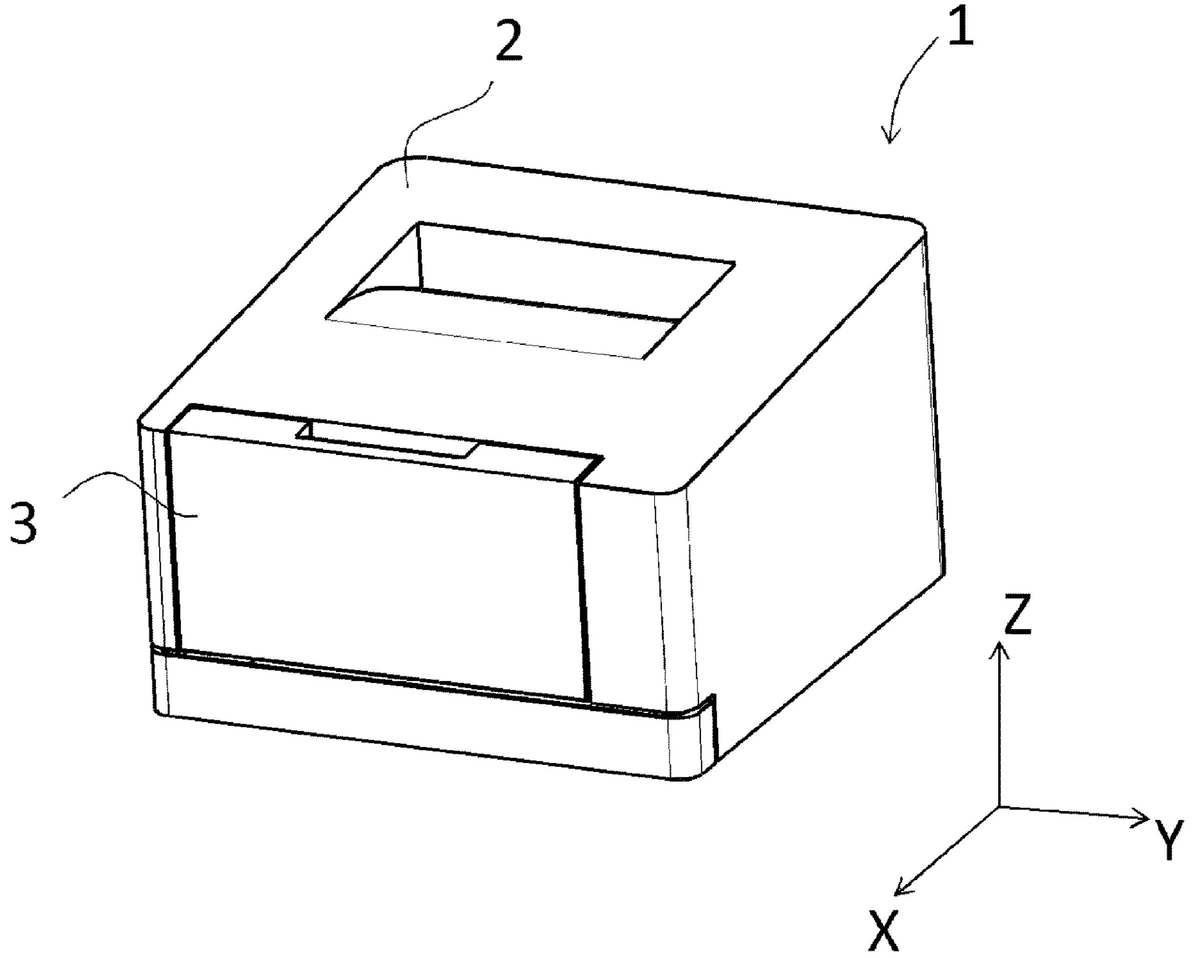
FIG. 1 is a schematic perspective view illustrating an appearance configuration of an image forming apparatus in a first embodiment.

Referring to the drawings, preferred embodiments of the present invention will be described below in detail by way of example. Note that dimensions, materials, shapes, relative positioning, and the like of components described in the following embodiments are to be appropriately changed according to a configuration of an apparatus to which the present invention is applied and various conditions. Therefore, it is not intended to limit the scope of the present invention unless otherwise specified.

First Embodiment

Configuration of Image Forming Apparatus

Figure 2:
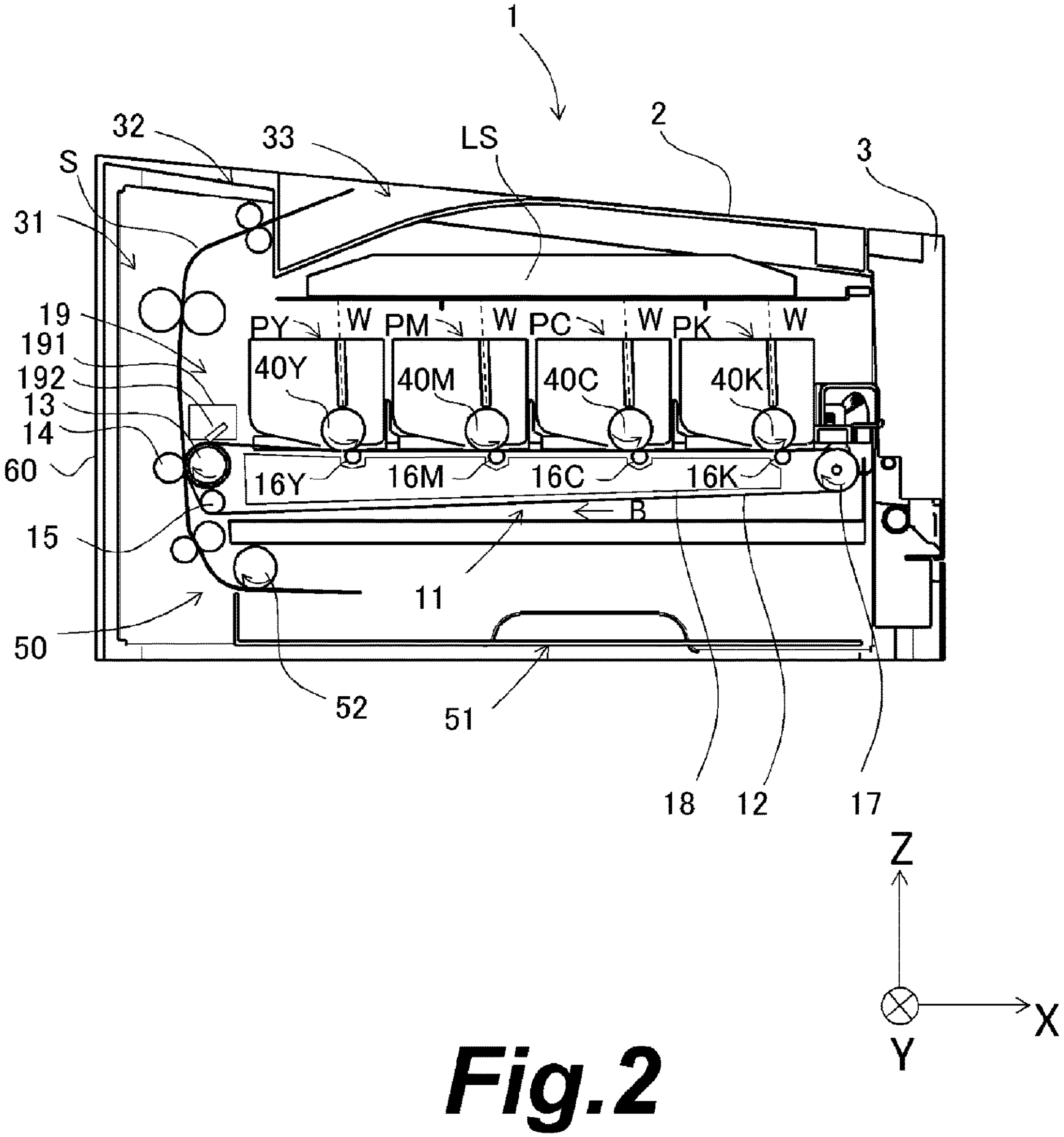
FIG. 2 is a cross-sectional view illustrating an inner configuration of the image forming apparatus in the first embodiment.

FIG. 1 is a schematic perspective view illustrating an appearance configuration of an image forming apparatus 1 in the present embodiment. FIG. 2 is a schematic cross-sectional view illustrating an inner configuration of the image forming apparatus 1. The image forming apparatus 1 in the present embodiment is a so-called tandem-type image forming apparatus having a plurality of image forming units PY, PM, PC, and PK. The first, second, third, and fourth image forming units PY, PM, PC, and PK form images using toners respectively in different colors of yellow (Y), magenta (M), cyan (C), and black (Bk).

The image forming apparatus 1 is of a process cartridge type, and each of the plurality of image forming units PY, PM, PC, and PK is configured as a process cartridge, and is detachable from an apparatus main body 2. Note that detachment or attachment of each of the process cartridges is performed in a state where an opening/closing door 3 provided in the image forming apparatus 1 is open. As illustrated in FIG. 2, the four image forming units are arranged in a line at given intervals, and respective configurations of the individual image forming units have many portions that are substantially common, except for the colors of the toners to be contained therein. Therefore, in the following description, the suffixes Y, M, C, and K given to the reference numerals to indicate that the image forming units are elements for the respective colors will be omitted when no particular distinction is required, and the elements will be collectively described.

In the following description, it is assumed with respect to the image forming apparatus 1 that a side provided with the opening/closing door 3 is a front surface (frontal surface), while a surface opposite to the front surface is a back surface (rear surface). Additionally, when the image forming apparatus 1 is viewed from the front surface, a right side is referred to as a drive side, while a left side is referred to as a non-drive side. Note that, in the drawings, a direction from the back surface of the apparatus main body 2 toward the front surface thereof, a direction from the non-drive side of the main body toward the drive side thereof, and a direction from a bottom surface of the apparatus main body 2 toward an upper surface thereof are respectively defined as an X-axis direction, a Y-axis direction, and a Z-axis direction.

As illustrated in FIG. 2, the individual image forming units P are arranged horizontally side by side with respect to the bottom surface of the apparatus main body 2. Each of the image forming units P has an electrophotographic process mechanism, and a rotational drive force is transmitted thereto from a cartridge drive transmission unit provided in the apparatus main body 2 and not shown. Each of the image forming units P has a photosensitive drum 40 serving as an image bearing member that bears a toner image (developer image), a charging means (not shown), and a developing means (not shown).

Above each of the image forming units P in the Z-axis direction, an exposing means LS is provided, and the exposing means LS outputs laser light correspondingly to image information received by a controller not shown. Laser light W output from the exposing means LS passes through an exposure window portion of the image forming unit P to perform scanning exposure on a surface of the photosensitive drum 40.

Meanwhile, below each of the image forming units P in the Z-axis direction, a transfer means 11 is provided. The transfer means 11 has a movable endless intermediate transfer belt 12, primary transfer rollers 16, a driver roller 13, a tension roller 17, an assist roller 15, a collecting means 19, and a container 18. The driver roller 13 is a stretching roller that receives the drive force and rotates to move the intermediate transfer belt 12 in a direction of an arrow B illustrated in the figure and stretch the intermediate transfer belt 12 in conjunction with the tension roller 17 and the assist roller 15. The collecting means 19 collects the toners (hereinafter referred to as the untransferred toners) remaining on the intermediate transfer belt 12. The untransferred toners collected by the collecting means 19 are contained in the container 18 provided in a region on an inner peripheral surface side of the intermediate transfer belt 12.

Each of the primary transfer rollers 16 is a transfer means for transferring the toner image born on the photosensitive drum 40 from the photosensitive drum 40 onto the intermediate transfer belt 12, and is in contact with an inner peripheral surface of the intermediate transfer belt 12. The individual primary transfer rollers 16Y, 16M, 16C, and 16K are provided correspondingly to the respective photosensitive drums 40Y, 40M, 40C, and 40K via the intermediate transfer belt 12. Each of the primary transfer rollers 16 is provided to extend in the direction (Y-axis direction) perpendicular to a moving direction (direction indicated by the arrow B) of the intermediate transfer belt 12. The individual primary transfer rollers 16 bias the intermediate transfer belt 12 against the respective photosensitive drums 40 to form primary transfer portions where the photosensitive drums 40 and the intermediate transfer belt 12 are in contact with each other.

In the present embodiment, as illustrated in FIG. 2, the individual primary transfer rollers 16 are disposed to be displaced from respective positions of the individual primary transfer portions where the respective photosensitive drums 40 and the intermediate transfer belt 12 are in contact with each other in the moving direction of the intermediate transfer belt 12. More specifically, the individual primary transfer rollers 16 are disposed to be shifted from the respective positions of the individual primary transfer portions on a downstream side in the moving direction of the intermediate transfer belt 12. Note that the individual primary transfer rollers 16 may also be shifted from the respective positions of the individual primary transfer portions on an upstream side in the moving direction of the intermediate transfer belt 12.

The collecting means 19 is provided in the vicinity of a rear door 60 for accessing the inside of the image forming apparatus 1 from the back surface side of each of the image forming units P corresponding to the back surface side of the image forming apparatus 1. The collecting means 19 has a frame body 191 and a cleaning blade 192 (hereinafter referred to as the blade) provided inside the frame body 191 to extend in the Y-axis direction. The blade 192 is disposed so as to come into contact with an outer peripheral surface of the intermediate transfer belt 12 in a counter direction facing the moving direction B of the intermediate transfer belt 12. The blade 192 collects the untransferred toners remaining on the intermediate transfer belt 12 to remove the untransferred toners from the intermediate transfer belt 12, and collects the removed untransferred toners in the frame body 191. Details of a configuration of the blade 192 will be described later.

At a position facing the driver roller 13 (drive rotating member) via the intermediate transfer belt 12, a secondary transfer roller 14 is disposed and, at a position where the secondary transfer roller 14 and the intermediate transfer belt 12 are in contact with each other, a secondary transfer portion is formed. In addition, on a side upstream of the secondary transfer portion in a direction of transport of a transfer material S, a feeding means 50 having a paper feeding cassette 51 that contains the transfer material S and a paper feeding roller 52 that feeds the transfer material S from the paper feeding cassette 51 toward the secondary transfer portion is provided.

On a side downstream of the secondary transfer portion in a moving direction of the transfer material S, a fixing means 31 that fixes the toner image onto the transfer material S and a discharge roller pair 32 that discharges, from the apparatus main body 2, the transfer material S having the toner image fixed thereto are provided. The transfer material S discharged by the discharge roller pair 32 from the apparatus main body 2 is stacked on a paper output tray 33.

Image Forming Operation

Next, an image forming operation of the image forming apparatus 1 of the present invention will be described. A control means such as a controller (not shown) receives an image signal to start an image forming operation, and each of the photosensitive drums 40, the driver roller 13, and the like starts to rotate at a predetermined peripheral speed (process speed) with the drive force from a drive source (not shown).

Each of the photosensitive drums 40 has a surface thereof uniformly charged by a charging means not shown to the same polarity as a normal charging polarity (which is a negative polarity in the present embodiment) of each of the toners. Then, through irradiation with the laser light W from the exposing means LS, an electrostatic latent image according to the image information is formed on the photosensitive drum 40. Then, with the toner contained in a developing means not shown, the electrostatic latent image formed on the photosensitive drum 40 is developed and, on the surface of the photosensitive drum 40, a toner image according to the image information is born. At this time, on the respective photosensitive drums 40Y, 40M, 40C, and 40K, toner images according to image components in the respective colors of yellow, magenta, cyan, and black are born.

Then, the toner images in the individual colors born on the respective photosensitive drums 40 reach the respective primary transfer portions with the rotation of the respective photosensitive drums 40. Then, by applying a voltage from the power source not shown to each of the primary transfer rollers 16, the toner images in the individual colors born by the respective photosensitive drums 40 are primarily transferred in successively stacked relation onto the intermediate transfer belt 12 in the respective primary transfer portions. As a result, on the intermediate transfer belt 12, the toner images in the four colors corresponding to an objective color image are formed.

Then, the four-color toner images born on the intermediate transfer belt 12 reaches the secondary transfer portion with movement of the intermediate transfer belt 12 to be secondarily transferred collectively onto a surface of the transfer material S such as paper or an OHP sheet in a process of passing through the secondary transfer portion. At this time, to the secondary transfer roller 14, a voltage of a polarity opposite to the normal charging polarity of each of the toners is applied from a secondary transfer power source not shown.

The transfer material S contained in the paper feeding cassette 51 is fed by the paper feeding roller 52 from the paper feeding cassette 51 at predetermined timing and transported toward the secondary transfer portion. Then, the transfer material S having the four-color toner images transferred thereon in the secondary transfer portion is heated and pressurized in the fixing means 31, and the four-color toners are thereby melted and color-mixed to be fixed to the transfer material S. Then, the transfer material S is discharged by the discharge roller pair 32 from the apparatus main body 2 to be stacked on the paper output tray 33 serving as a loading portion. In the image forming apparatus 1 in the present embodiment, by the foregoing operation, a full-color printed image is formed.

Note that, in the image forming apparatus 1 in the present embodiment, the controller, not shown, for controlling an operation of each of the portions of the image forming apparatus, a memory (not shown) serving as a storage means in which various control information is stored, and the like are mounted. The controller performs control related to the transport of the transfer material S, control related to driving of each of the intermediate transfer belt 12 and the individual image forming units P serving as the process cartridges, control related to image formation, and the like.

Figure 3A:
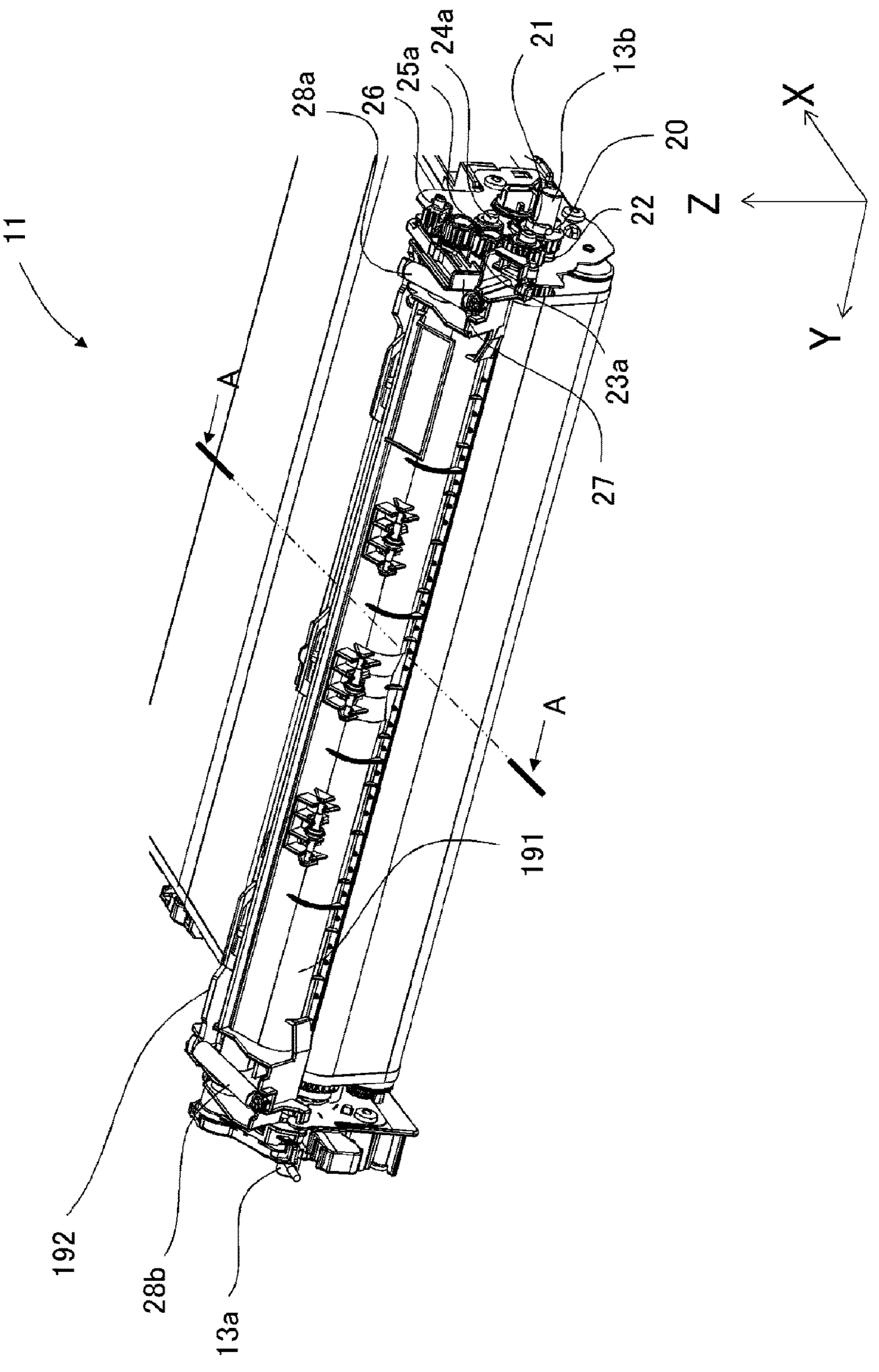
FIG. 3A is a perspective view illustrating a configuration around a blade in a transfer means in the first embodiment.
Figure 6A:
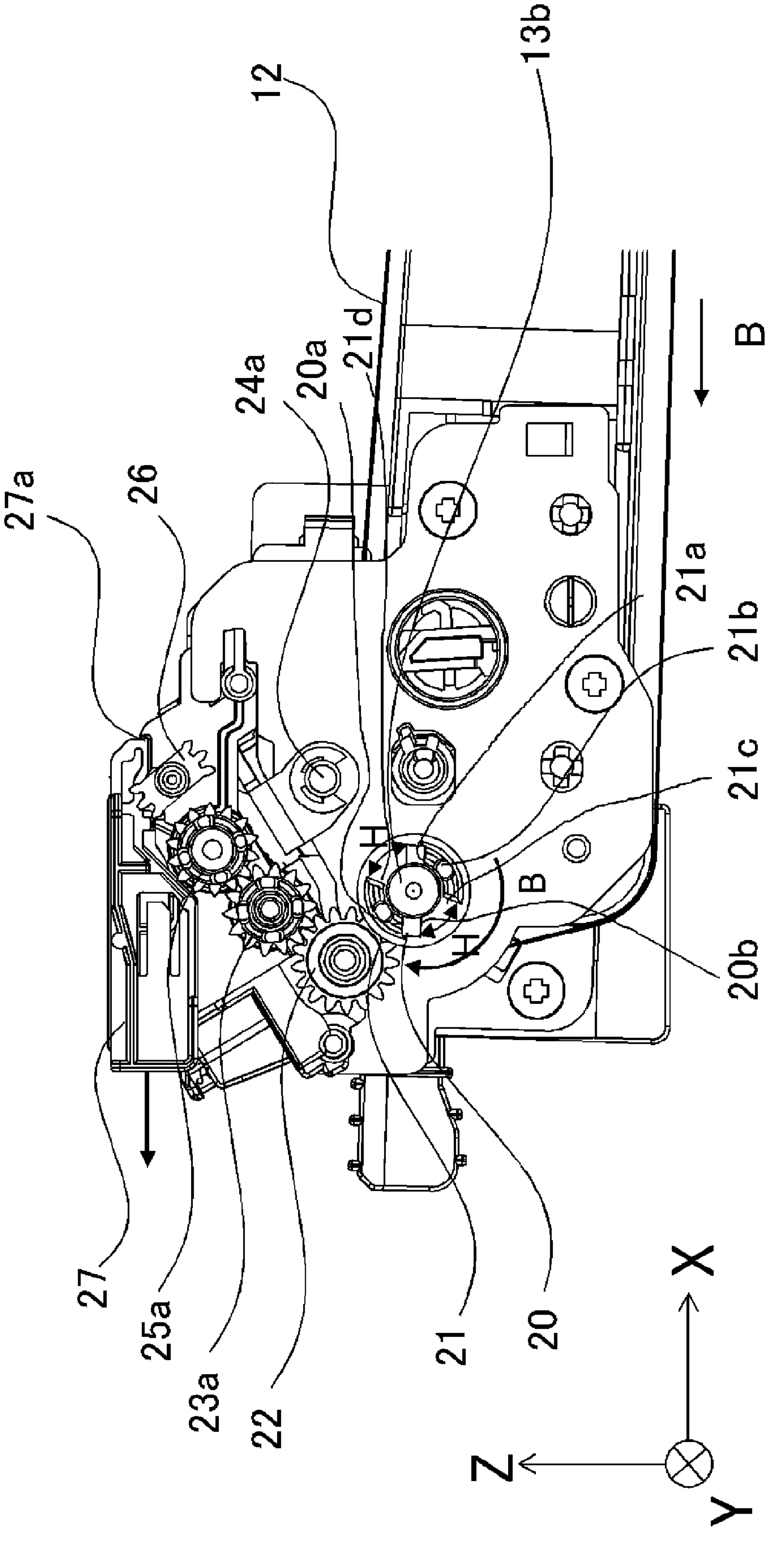
FIG. 6A is a side view illustrating an operation of the blade moving mechanism in the first embodiment.

Configurations of Drive Transmission Mechanism and Cleaning Mechanism in Transfer Means FIGS. 3A, 3B, and 6A to 6C illustrate respective configurations of a drive transmission mechanism and a cleaning mechanism in the transfer means 11 in the present invention. As illustrated in FIGS. 3A and 6A, the drive force from the drive source (not shown) is input to a drive-side end 13*a* of the driver roller 13, and the driver roller 13 and a non-drive-side end 13*b* thereof are driven by the drive force. A through hole is provided in the non-drive-side end 13*b* of the driver roller 13 to extend in a direction crossing an axial direction and, into the through hole, a drive transmission pin 20 is inserted, and the drive force is transmitted by the drive transmission pin 20 to a drive gear 21 provided at the non-drive-side end 13*b*. The drive gear 21 has a circumferential part provided with a contacted portion 21*b* with which the drive transmission pin 20 can come into contact in a circumferential direction, while having a part other than the contacted portion 21*b* corresponding to a space 21*c*. When the drive transmission pin 20 is present in the space 21*c* part, there is a section (backlash or play) in which the driver roller 13 idles after the drive force is input to the driver roller 13 until the drive transmission pin 20 comes into contact with the contacted portion 21*b*. As a result of rotation of the driver roller 13 in the forward direction B during the use of the image forming apparatus 1 and contact of a contacting surface 20a of the drive transmission pin 20 with a drive transmission surface 21a of the contacted portion 21b through the idling section, the drive force input to the driver roller 13 is transmitted to the drive gear 21. The drive force transmitted to the drive gear 21 is transmitted to an idler gear 22, a stirring gear 23a, and a screw gear 25a in this order, and a separating gear 26 is provided at a most downstream position to which the drive force can be transmitted from the screw gear 25a. In the vicinity of the foregoing gear train, a blade shaft 24a (on a non-drive side) that rotatably supports the blade 192 is provided. By the drive transmission mechanism, a rotation shaft of the driver roller 13 serving as the stretching roller and the separating gear 26 serving as a rotating member are connected such that a rotating force can be transmitted therebetween.

Figure 3B:
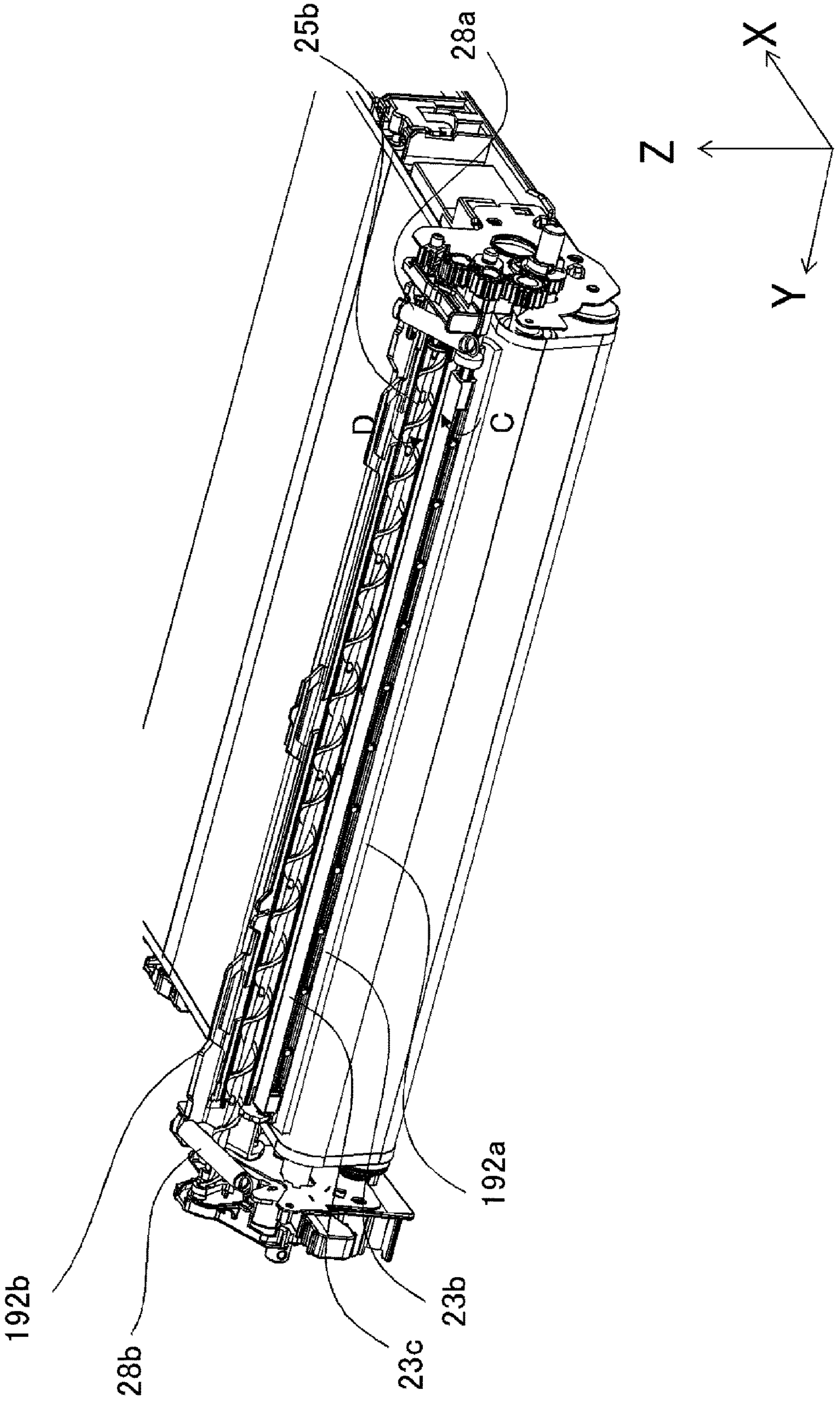
FIG. 3B is a diagram illustrating an inner state where a frame body 191 in FIG. 3A is detached.

A cleaning mechanism using the foregoing drive transmission mechanism is illustrated in FIG. 3B. FIG. 3B illustrates an inner state where the frame body 191 in FIG. 3A is detached. The blade 192 has a blade portion 192a formed of a flexible elastic rubber material and a plate portion 192b supporting the blade portion 192a bonded thereto. At both end portions in the Y-direction, between the plate portion 192b and the frame body 191, blade springs 28a and 28b are stretched. By the blade springs 28a and 28b, a force to press the blade portion 192a against the intermediate transfer belt 12 is exerted thereon, and the blade portion 192a comes into contact with the intermediate transfer belt 12, while warping. By coming into contact with the rotating intermediate transfer belt 12, the blade portion 192a scrapes the untransferred toners on the intermediate transfer belt 12, and the scraped untransferred toners are collected in the frame body 191. In the frame body 191, a stirring shaft 23b provided coaxially with the stirring gear 23a and a stirring sheet 23c fixed to the stirring shaft 23b are provided. As a result of rotation of the stirring shaft 23b in an arrow C direction (clockwise when viewed in a +Y-direction) in FIG. 3B, the stirring sheet 23c rotates along an inner wall of the frame body 191 in the frame body 191. As a result, the untransferred toners in the frame body 191 are transported to a screw 25b portion. The screw 25b is provided coaxially with the screw gear 25a and, as a result of rotation of the screw 25b in an arrow D direction (counterclockwise when viewed in the +Y direction) in FIG. 3B, the untransferred toners are transported in the +Y direction. The transported untransferred toners are contained in the container 18.

Blade Moving Mechanism

Since the blade 192 is constantly under a force applied by the blade springs 28a and 28b in a direction in which the blade 192 is pressed against the intermediate transfer belt 12, unless appropriate measures are taken, the blade 192 may be plastically deformed under the influence of an ambient temperature or a humidity during transportation, storage, or the like. When the blade 192 is plastically deformed, it may be possible that a position where the intermediate transfer belt 12 and the blade 192 are in contact with each other is displaced from an appropriate position or a manner in which the blade 192 warps changes, and consequently the untransferred toners may not be able to be satisfactorily removed from the intermediate transfer belt 12.

Accordingly, in the present embodiment, a blade moving mechanism capable of moving the blade 192 from a contact position where the untransferred toners can appropriately be removed from the intermediate transfer belt 12 to a retracted position where the force pressing the intermediate transfer belt 12 is smaller than that at the contact position is provided. During transportation or storage, a user operates the blade moving mechanism to move the blade 192 from the contact position to the retracted position, thereby successfully inhibiting the blade 192 from being plastically deformed.

Figure 4A:
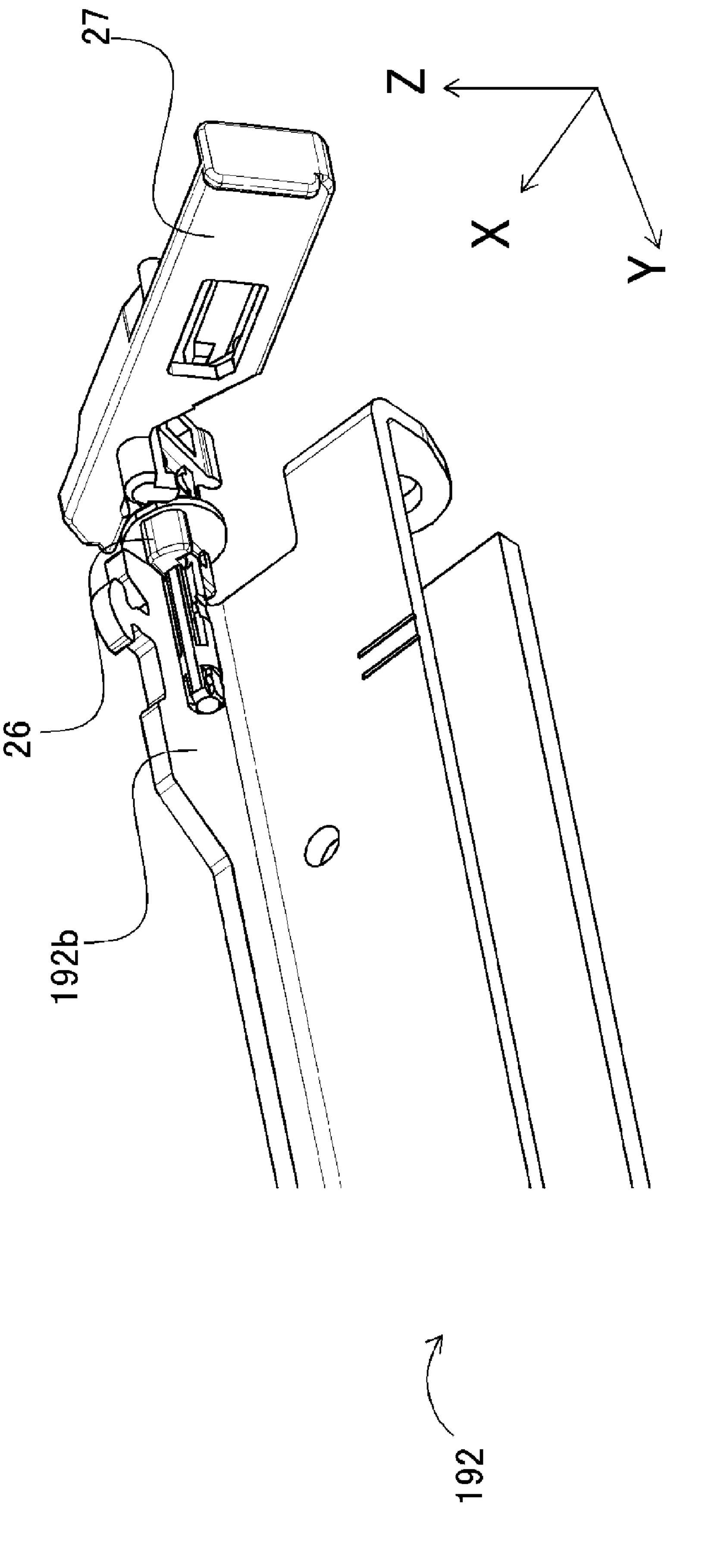
FIG. 4A is a perspective view illustrating a configuration of a blade moving mechanism in the first embodiment.
Figure 4B:
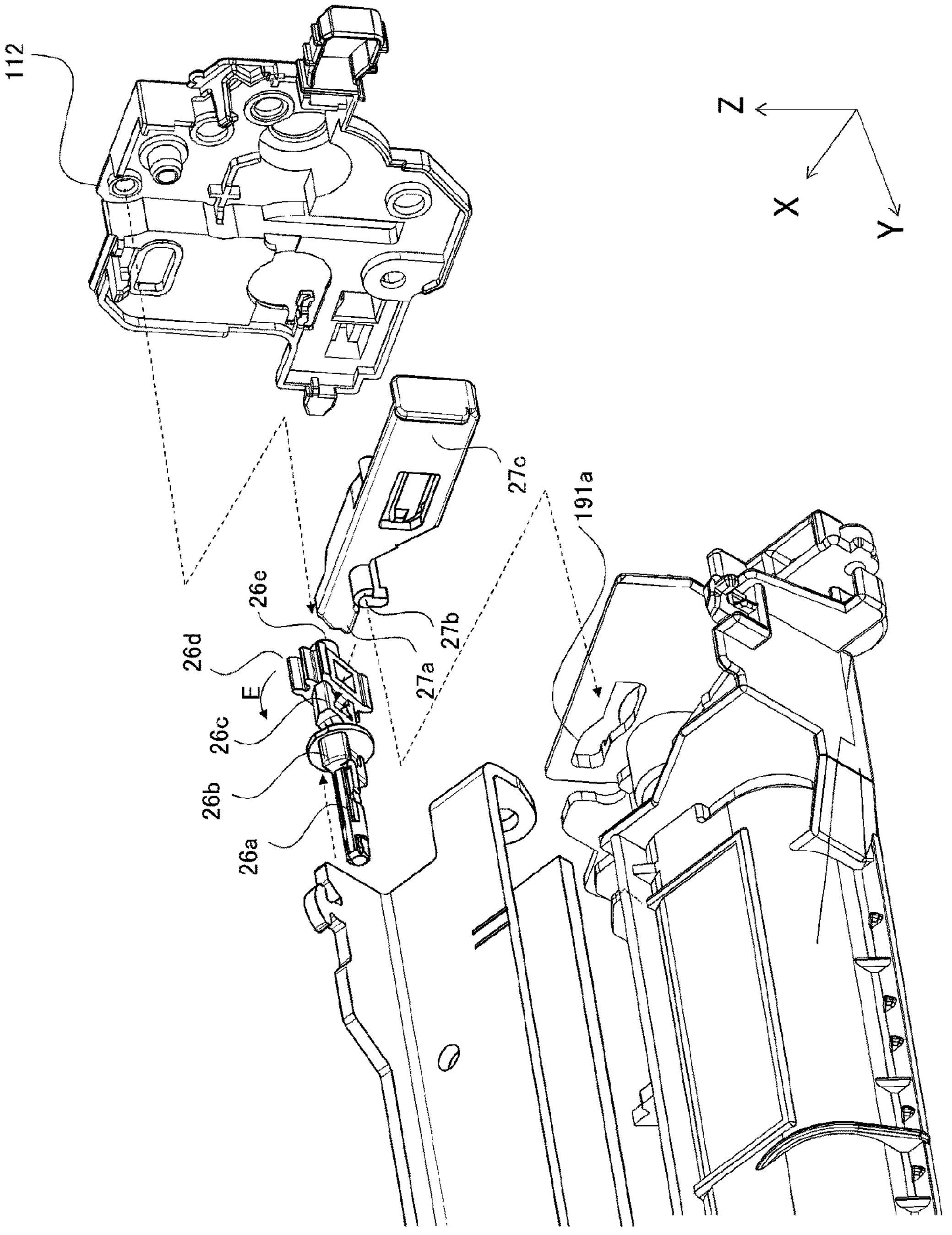
FIG. 4B is a perspective view illustrating the configuration of the blade moving mechanism in the first embodiment.

FIGS. 4A and 4B are diagrams each illustrating a configuration of the blade moving mechanism. As described above on the basis of FIGS. 3A, 3B, and 6A to 6C, the separating gear 26 is provided most downstream in the drive transmission mechanism. The separating gear 26 is the rotating member that rotates to act on the blade 192 and move the blade 192 between the contact position where the blade 192 is in contact with the intermediate transfer belt 12 and the retracted position to which the blade 192 is retracted away from the intermediate transfer belt 12.

The blade moving mechanism is provided with a lever 27 that allows the separating gear 26 to rotate around a Y-axis. The lever 27 is an operation member on which a user operation for exerting a force on the separating gear 26 serving as the rotating member and rotating the separating gear 26 can be performed. The lever 27 is separate from the separating gear 26 and unconnected to the separating gear 26. In addition, the lever 27 is detachable from the image forming apparatus 1. Details thereof will be described later. In the blade moving mechanism in the present embodiment, in a state where the blade 192 is at the contact position, the user operates the lever 27 to rotate the separating gear 26 to be able to move the blade 192 to the retracted position. When the drive force is input to the driver roller 13 in a state where the blade 192 is at the retracted position, the drive force is transmitted by the drive transmission mechanism described above to the separating gear 26 to rotate the separating gear 26, and the blade 192 automatically moves from the retracted position to the contact position.

The separating gear 26 has supporting portions 26a and 26e at both ends thereof in the Y-axis direction, and has a separating portion 26b, a lever receiving portion 26c, and a gear portion 26d therebetween. In the separating gear 26, the supporting portion 26a is rotatably supported by the frame body 191, while the supporting portion 26e is rotatably supported by a cover 112 provided at a part of the transfer means 11. When the blade 192 is at the retracted position, the separating portion 26b comes into contact with each of the plate portion 192b and the frame body 191 to support the plate portion 192b with respect to the frame body 191 against the pressing forces of the blade springs 28a and 28b (see also FIG. 7B). Note that FIGS. 4A and 4B illustrate a state where the blade 192 is at the contact position.

The lever receiving portion 26c comes into contact with a leading end portion 27a of the lever 27 to rotate the separating gear 26 by approximately 90° in a direction E (clockwise when viewed in the +Y-direction or a first direction) via an operation of linearly moving the lever 27 (pushing operation) in an +X-direction. Thus, it is possible to move the blade 192 from the contact position illustrated in FIG. 4B to the retracted position. The operation of pushing the lever 27 in the +X-direction is a user operation in a direction along the first direction corresponding to a rotating direction of the separating gear 26. The lever 27 is brought into contact with the lever receiving portion 26c of the separating gear 26 by the user operation in the direction along the first direction to exert a force to rotate the separating gear 26 in the first direction thereon. Note that the lever 27 is configured to be moved away from the separating gear 26 by a user operation in a direction along a second direction corresponding to a direction (counterclockwise when viewed in the +Y-direction) opposite to the first direction and prevent the force from being exerted on the separating gear 26. Specifically, the leading end portion 27*a* of the lever 27 comes into contact with the lever receiving portion 26*c* in the +X-direction, but the two members are separate from and unconnected to each other. In other words, the separating gear 26 serving as the rotating member that moves the blade 192 and the lever 27 serving as the operation member to be operated by the user are independent of each other, and only the operation of pushing the lever 27 in the +X-direction affects the separating gear 26, while an operation of pulling the lever 27 in an −X-direction does not affect the separating gear 26. Accordingly, even when the user pushes the lever 27 to move the blade 192 to the retracted position, and then pulls the lever 27 in the −X-direction, the blade 192 does not move from the retracted position. The lever 27 thus configured is an example of a regulating member that regulates rotation of the separating gear 26 in the second direction. As a result, the blade 192 has excellent stability at the retracted position during a task in the apparatus main body or during handling of the image forming apparatus. Note that the lever 27 is formed with a protruded portion 27*b* protruded in the +Y-direction, and thus configured to be able to engage the protruded portion 27*b* with a groove portion 191*a* of the frame body 191. The user engages the protruded portion 27*b* with the groove portion 191*a* when operating the lever 27 to inhibit the lever 27 from falling off and improve workability. In addition, the lever 27 is provided with a grip portion 27*c* for the user to grip, which also contributes to improving the workability of the user.

When the blade 192 is at the retracted position, the gear portion 26*d* is engaged with the screw gear 25*a*, though details thereof will be described later (see also FIG. 6B). As a result, when the image forming apparatus 1 is used in a state where the blade 192 is at the retracted position, the drive force input to the driver roller 13 is transmitted by the drive transmission mechanism described above to the separating gear 26. Consequently, the separating gear 26 is rotated by approximately 90° in the direction E (clockwise when viewed in the +Y-direction or the first direction) (see also FIG. 6C). As a result, the state where the separating portion 26*b* supports the plate portion 192*b* with respect to the frame body 191 is eliminated (see also FIG. 7C), and the blade 192 moves from the retracted position to the contact position. The blade 192 is configured to move from the contact position to the retracted position as a result of rotation of the separating gear 26 in the first direction and move from the retracted position to the contact position as a result of further rotation of the separating gear 26 in the first direction. After moving from the contact position to the retracted position as a result of the rotation of the separating gear 26 in the first direction, the blade 192 can also move from the retracted position to the contact position as a result of rotation of the separating gear 26 in the second direction. However, in the present embodiment, the regulating member that regulates the rotation of the separating gear 26 in the first direction after the movement of the blade 192 from the contact position to the retracted position is provided. In addition, in the present embodiment, the regulating member that regulates the rotation of the separating gear 26 in the second direction after the movement of the blade 192 from the contact position to the retracted position is provided. This regulates movement of the blade 192 having moved from the contact position to the retracted position from the retracted position to the contact position. Note that, when the drive force is input to the driver roller 13 by starting of the use of the image forming apparatus 1, the regulation of the rotation of the separating gear 26 in the first direction by the regulating member is removed, and the blade 192 moves from the retracted position to the contact position. Details thereof will be described later.

Figure 5A:
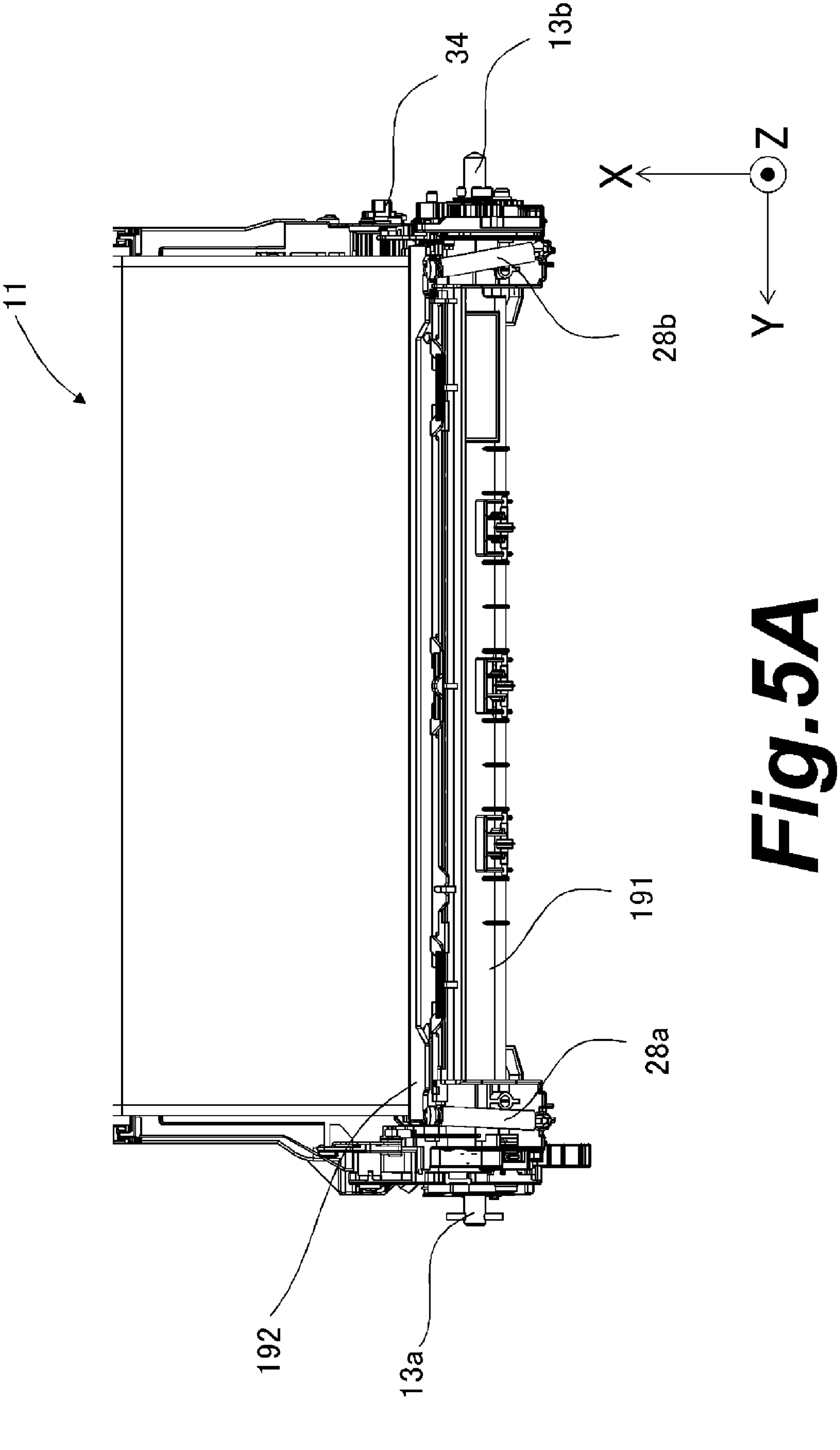
FIG. 5A is a top view illustrating the blade moving mechanism in the first embodiment.
Figure 5B:
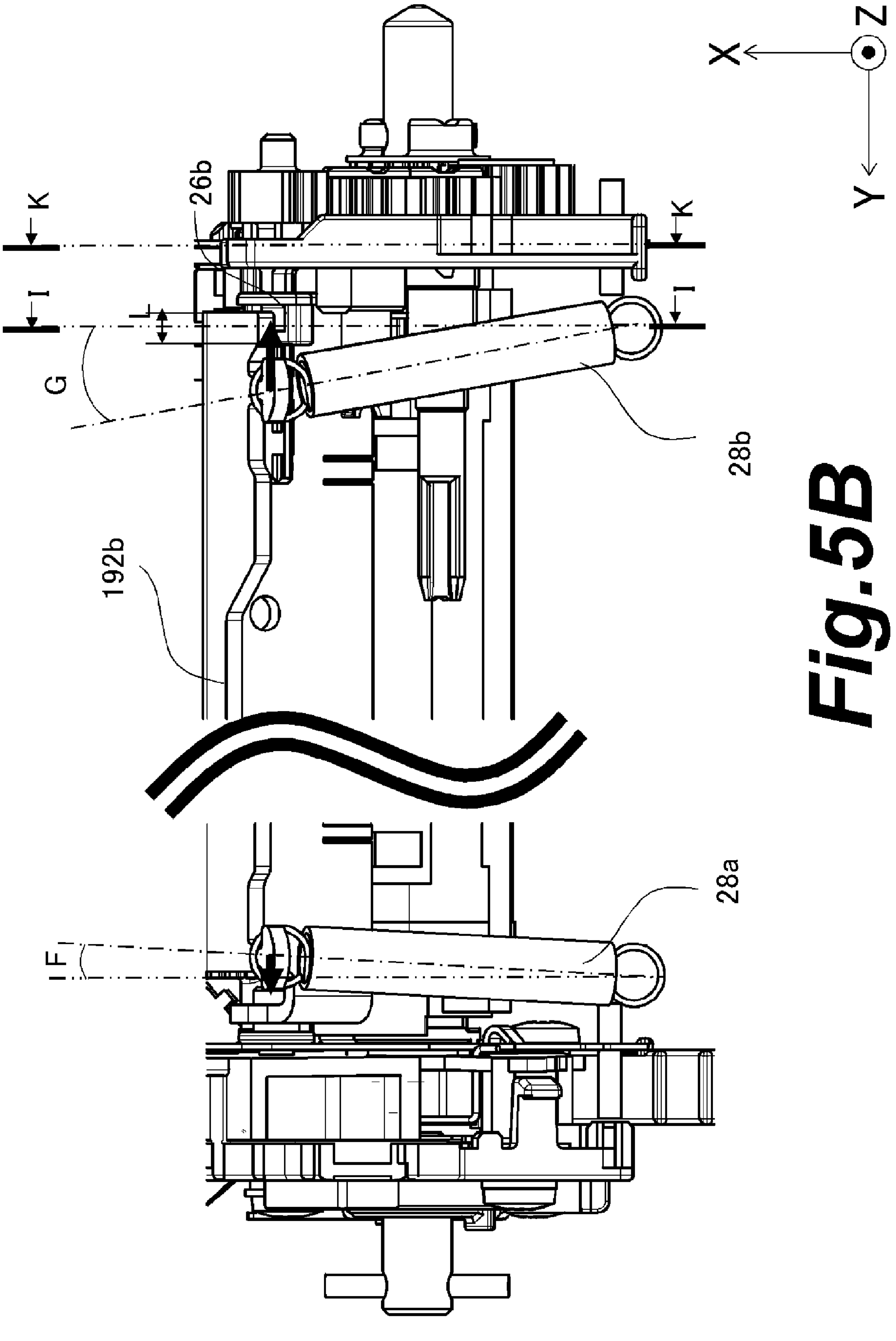
FIG. 5B is a top view illustrating the blade moving mechanism in the first embodiment.

FIGS. 5A and 5B illustrate a configuration of the blade moving mechanism when viewed from above in the Z-direction. As illustrated in FIGS. 5A and 5B, the drive-side blade spring 28*a* stretched between the frame body 191 and the plate portion 192*b* is inclined at an angle F in a −Y-direction with respect to the X-axis, while the non-drive-side blade spring 28*b* is inclined at an angle G in the +Y-direction with respect to the X-axis. A Y-direction component of a tensile force of the drive-side blade spring 28*a* faces the +Y-direction, while a Y-direction component of a tensile force of the non-drive-side blade spring 28*b* faces the −Y-direction. In the present embodiment, the blade springs 28*a* and 28*b* are configured to satisfy $F<G$, and consequently a resultant force of the Y-direction component forces of the tensile forces of the blade springs 28*a* and 28*b* faces the −Y-direction. Accordingly, a force to press the blade 192 in the −Y-direction (non-drive side) is exerted thereon to bias the blade 192 in the −Y-direction in backlash or play. As a result, it is possible to maximize an amount of engagement L between the separating portion 26*b* of the separating gear 26 provided on the non-drive side and the plate portion 192*b* in the Y-direction and reduce variation of the amount of engagement L, resulting in improved stability of an operation of the blade moving mechanism.

Operation of Blade Moving Mechanism

Figure 6B:
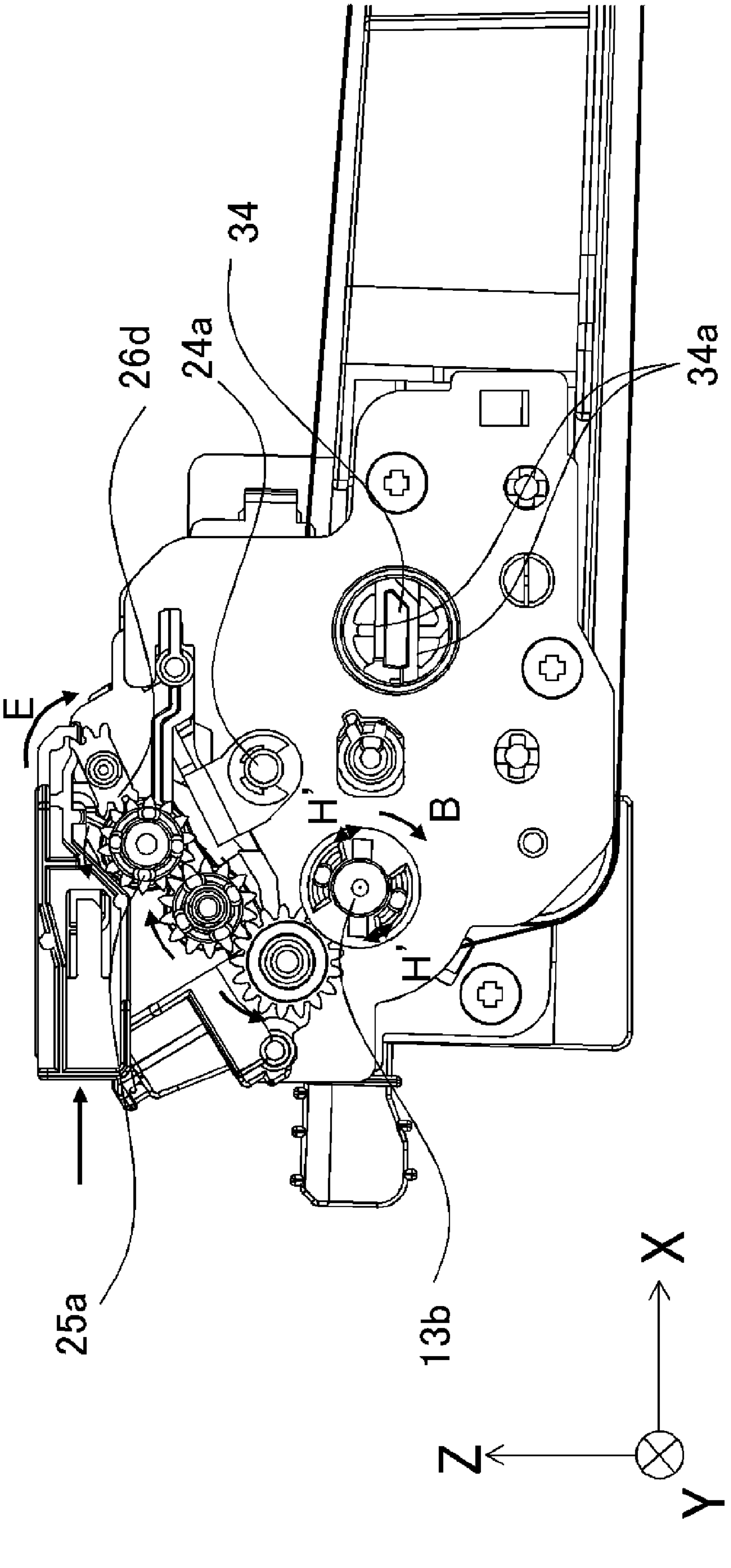
FIG. 6B is a side view illustrating the operation of the blade moving mechanism in the first embodiment.

FIGS. 6A to 6C are diagrams illustrating the respective operations of the blade moving mechanism and the drive transmission mechanism when the blade 192 automatically moves from the contact position to the contact position via a separated position. FIG. 6A illustrates a state where the blade 192 is at the contact position before a retracting operation is performed. At the time of an inspection, an operation check, or the like performed before shipment of the image forming apparatus, the blade 192 is at the contact position. FIG. 6A illustrates a state after the driver roller 13 and the intermediate transfer belt 12 each having received the drive force from the drive source rotate in the direction B (forward direction during the use of the image forming apparatus). The state is reached where the contacting surface 20*a* of the drive transmission pin 20 inserted in the non-drive-side end 13*b* of the driver roller 13 is in contact with the drive transmission surface 21*a* of the drive gear 21 facing the forward rotation direction B of the contacted portion 21*b* thereof. At this time, the space 21*c* between a contacting surface 20*b* of the drive transmission pin 20 opposite to the contacting surface 20*a* thereof to be used for drive transmission during the rotation in the forward direction B and a non-drive transmission surface 21*d* of the contacted portion 21*b* of the drive gear 21 not to be used for drive transmission serves as an idling section H. In addition, the separating gear 26 has teeth provided in circumferential parts thereof to be engaged with the screw gear 25*a* and, when the blade 192 is at the contact position, the teeth of the separating gear 26 are not engaged with the screw gear 25*a*, and the drive force is not transmitted to the separating gear 26. The leading end portion 27*a* of the lever 27 is at a pushing position located ahead of the separating gear 26 in the X-direction.

By performing a direct moving operation of pulling the lever 27 in the −X-direction from the state in FIG. 6A and pushing the lever 27 in the +X-direction, the blade 192 is moved to the retracted position illustrated in FIG. 6B. More specifically, the leading end portion 27*a* of the lever 27 comes into contact with the lever receiving portion 26*c* of the separating gear 26 to rotate the separating gear 26 by approximately 90° in the direction E (clockwise when viewed in the +Y-direction or the first direction). With the rotation of the separating gear 26, the gear portion 26*d* rotates to a position where the teeth are engaged with the screw gear 25*a*. In a process in which the blade 192 moves to the retracted position, the gear portion 26*d* rotates the screw gear 25*a*. Together with the screw gear 25*a*, the stirring gear 23*a*, the idler gear 22, and the drive gear 21 also rotate herein. In the state where the blade 192 is at the contact position in FIG. 6A, the idling section H is present. Consequently, even in a state where the driver roller 13 is connected to the drive source, it is possible to rotate the drive gear 21 until the non-drive transmission surface 21*d* of the contacted portion 21*b* of the drive gear 21 comes into contact with the contacting surface 20*b* of the drive transmission pin 20. An idling section H' in a state where the blade 192 has reached the retracted position in FIG. 6B from the contact position in FIG. 6A is smaller than the idling section H at the contact position, as illustrating in FIG. 6B. An angle of the idling section H' remaining at the retracted position in FIG. 6B is smaller than an angle required by the blade 192 to reach the contact position after further rotation of the separating gear 26 in the direction E from the retracted position in FIG. 6B. Accordingly, even when a force to rotate the separating gear 26 in the direction E (clockwise) is exerted thereon by transportation or handling, the drive transmission pin 20 and the drive gear 21 come into contact with each other to lock the rotation of the separating gear 26. As a result, even when an external force is exerted, the blade 192 is inhibited from moving from the retracted position, and stability of the blade 192 at the retracted position is improved.

When the image forming apparatus 1 is used in the state in FIG. 6B, and the drive force is input to the driver roller 13, the drive force is transmitted to the drive transmission mechanism via the drive transmission pin 20. As a result, the contacting surface 20*a* of the drive transmission pin 20 comes into contact with the drive transmission surface 21*a* of the contacted portion 21*b* of the drive gear 21 to rotate the drive gear 21 in the direction B, and the rotating force thereof is transmitted by the drive transmission mechanism to the separating gear 26 to rotate the separating gear 26 in the direction E (first direction). As a result of the rotation of the separating gear 26 by approximately 90° in the direction E (first direction), the blade 192 moves to the contact position.

Thus, the drive transmission mechanism is configured to allow the drive gear 21 to idle only by an angle required by the blade 192 to at least move from the contact position to the retracted position without involving the rotation of the driver roller 13 and thus allow the separating gear 26 to idle in the first direction. In addition, an angle that allows the separating gear 26 to further idle in the first direction without involving the rotation of the driver roller 13 after the movement of the blade 192 from the contact position to the retracted position corresponds to the idling section H' of the drive gear 21. This angle is set to be smaller than a rotation angle in the first direction (corresponding to the idling section H of the drive gear 21) required by the blade 192 to move from the retracted position to the contact position. The drive transmission mechanism thus set is an example of the regulating member that regulates the rotation of the separating gear 26 in the first direction after the movement of the blade 192 from the contact position to the retracted position.

Figure 7A:
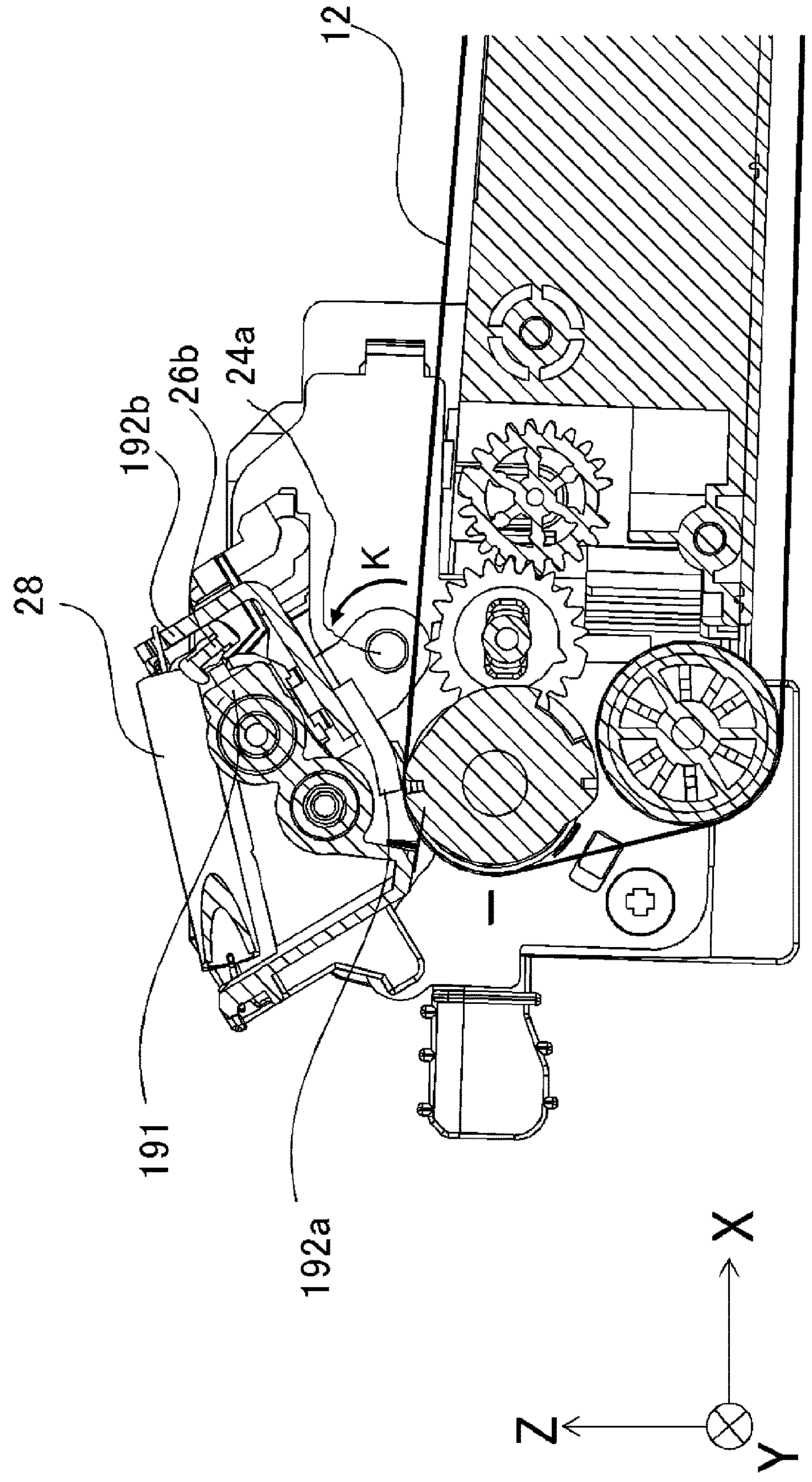
FIG. 7A is a cross-sectional view illustrating the operation of the blade moving mechanism in the first embodiment.
Figure 7B:
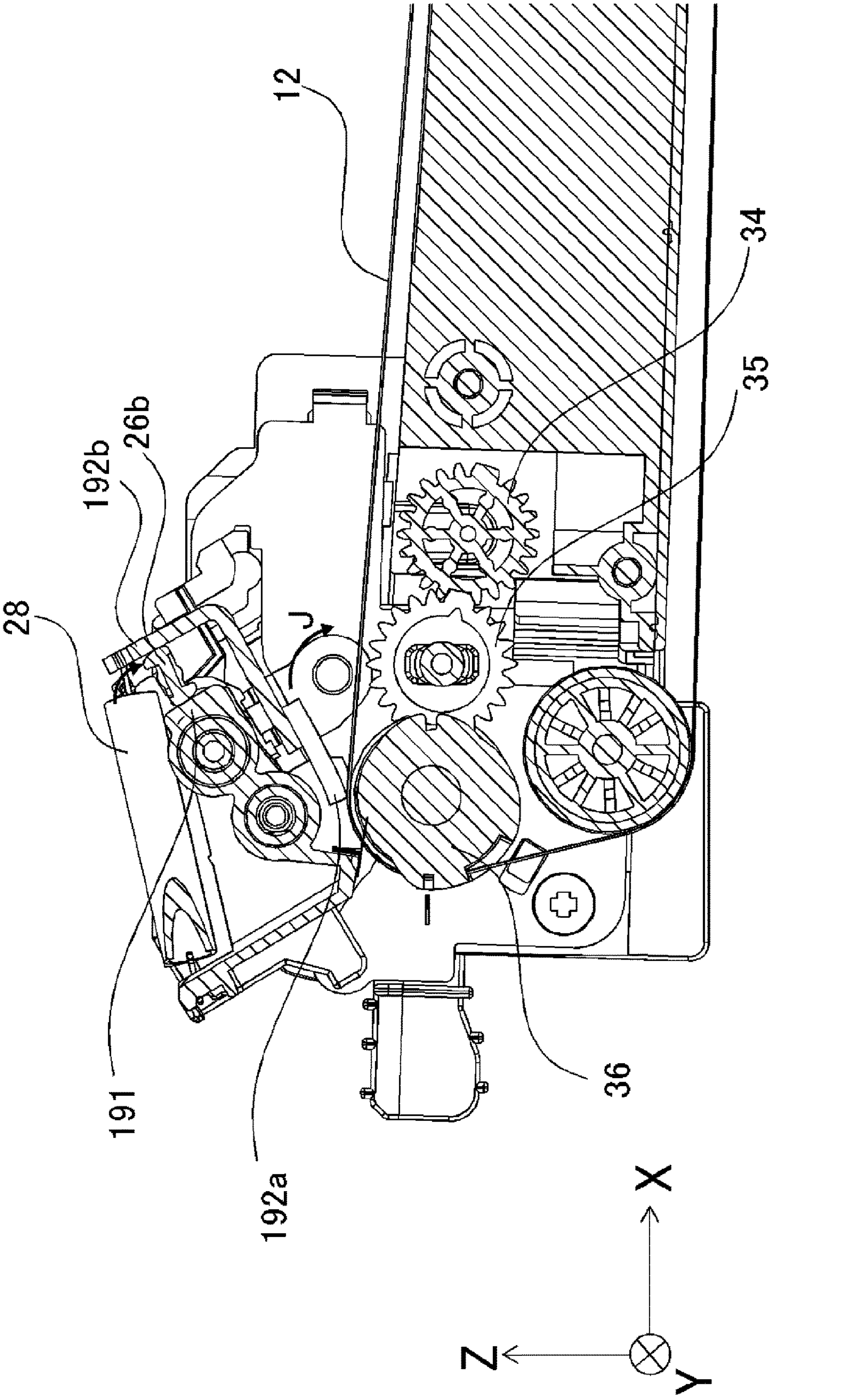
FIG. 7B is a cross-sectional view illustrating the operation of the blade moving mechanism in the first embodiment.
Figure 7C:
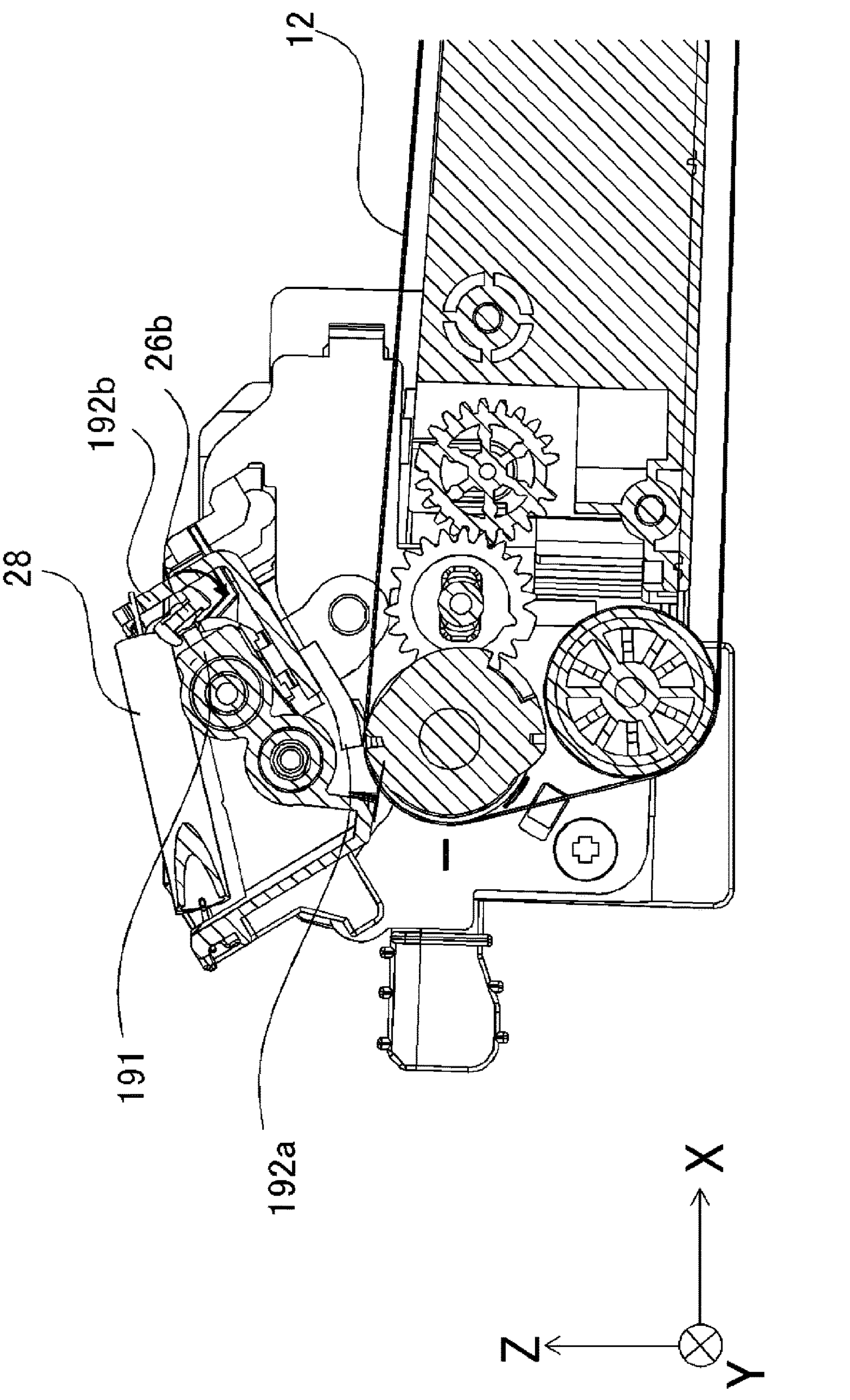
FIG. 7C is a cross-sectional view illustrating the operation of the blade moving mechanism in the first embodiment.

FIGS. 7A to 7C are diagrams illustrating the respective operations of the blade moving mechanism and the drive transmission mechanism when the blade 192 automatically moves from the contact position to the contact position via the separated position. FIGS. 7A to 7C illustrate cross sections taken along a plane indicated by a line I-I in FIG. 5B. FIG. 7A illustrates a state where the blade 192 is at the contact position. When a rotational position of the separating portion 26*b* is in the phase illustrated in FIG. 7A, the separating portion 26*b* does not come into contact with the frame body 191. The blade 192 that has received the forces of the blade springs 28 receives a counterclockwise (indicated by an arrow K) moment when viewed in the +Y-direction around a blade shaft 24*a*, and the blade portion 192*a* is thereby pressed against the intermediate transfer belt 12 and brought into a warped and contacting state.

By performing the moving operation described above in this state, the separating gear 26 clockwise rotates by approximately 90°, and the blade 192 moves to the retracted position illustrated in FIG. 7B. At the retracted position, the rotational position of the separating portion 26*b* is in the phase illustrated in FIG. 7B to provide a state where the separating portion 26*b* is in contact with both of the plate portion 192*b* and the frame body 191 to support the plate portion 192*b* with respect to the frame body 191 against the tensile forces of the blade springs 28. At this time, the forces exerted by the blade springs 28 on the blade 192 are received by the frame body 191 via the separating portion 26*b*. The position of the blade 192 at the retracted position in FIG. 7B has rotated clockwise (indicated by an arrow J) when viewed in the +Y-direction with respect to the position thereof at the contact position in FIG. 7A, and an amount of warping of the blade portion 192*a* is smaller than that at the contact position. By moving the blade 192 to the retracted position, it is possible to provide a state in which the amount of warping of the blade portion 192*a* is small, and a pressing force under which the blade 192 comes into contact with the intermediate transfer belt 12 is small. As a result, by moving the blade 192 to the retracted position during transportation, storage, or the like, it is possible to attenuate creep of or an impact on the blade portion 192*a* even when heat or an external force is received, and reduce influence thereof on untransferred toner removal performance. Note that configuration is made such that, even in a state where the blade 192 is at the retracted position, the blade portion 192*a* is in contact with the intermediate transfer belt 12. This inhibits the untransferred toners in the frame body 191 from leaking to the outside when the blade 192 is at the retracted position. In addition, each of the portions of the separating portion 26*b* that are in contact with the plate portion 192*b* and the frame body 191 is formed of a plane to allow a state where the blade 192 is stably at the retracted position to be maintained against an impact or the like.

When the image forming apparatus 1 is used in the state where the blade 192 is at the retracted position in FIG. 7B and the drive force is input to the driver roller 13, the separating gear 26 receives the drive force transmitted via the drive transmission mechanism to further clockwise rotate by approximately 90° when viewed in the +Y-direction. Specifically, when the separating gear 26 clockwise rotates and then rotates at a certain angle, the teeth of the separating gear 26 and the screw gear 25*a* are no longer engaged with each other. However, the separating gear 26 receives a force exerted from the plate portion 192*b* to continue to rotate, and the blade 192 moves to the contact position illustrated in FIG. 7C. At the contact position in FIG. 7C, in the same manner as in FIG. 7A, the blade portion 192*a* warps to come into contact with the intermediate transfer belt 12 with a predetermined pressing force and provide a state where the untransferred toners on the intermediate transfer belt 12 can appropriately be removed.

Locking Mechanism Using Lever

Figure 8:
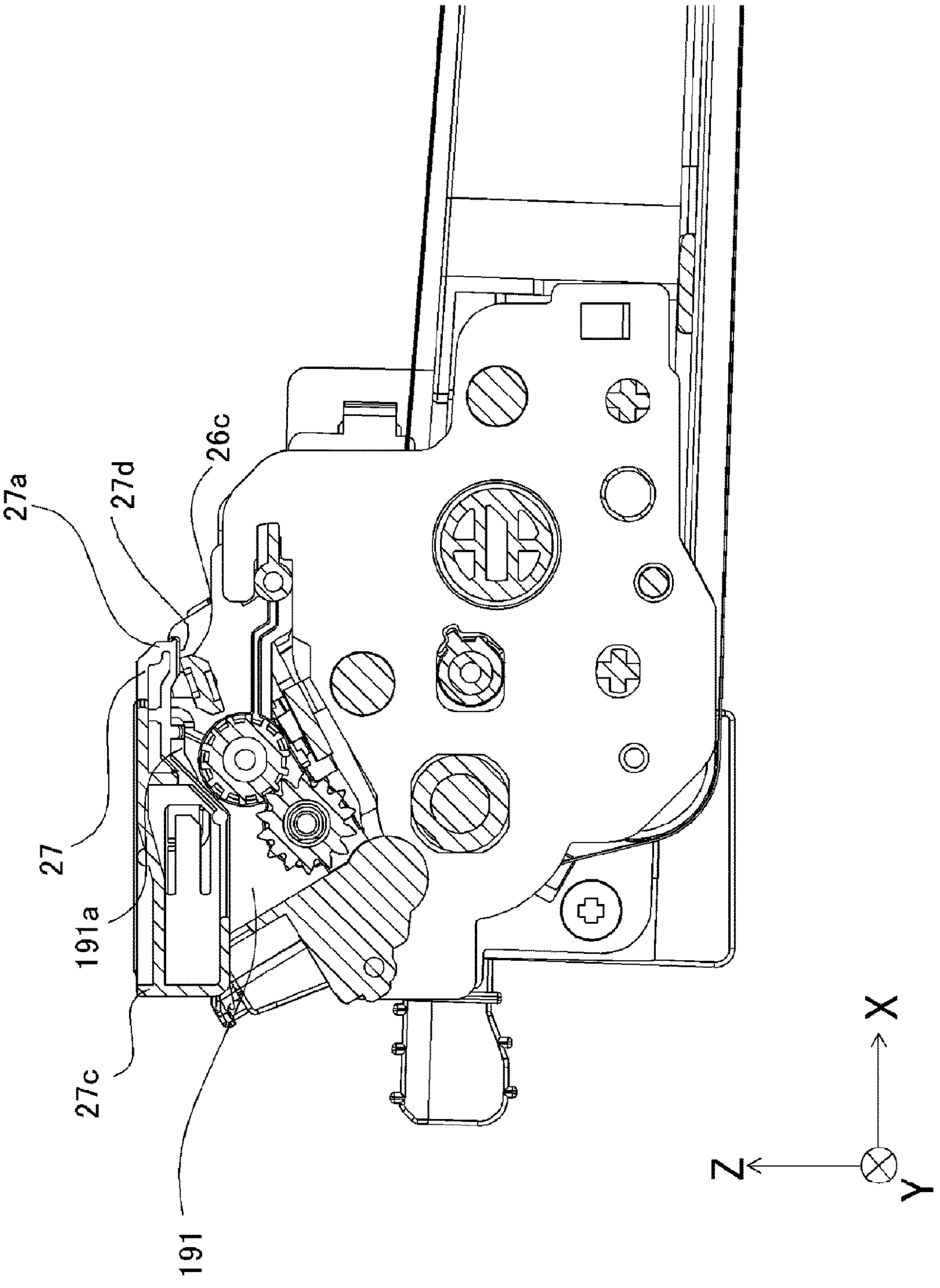
FIG. 8 is a cross-sectional view illustrating locking by a lever in the first embodiment.

FIG. 8 is a diagram illustrating a positional relationship between the lever 27 and the lever receiving portion 26*c* of the separating gear 26 in a state where the lever 27 is pushed in the +X-direction and the blade 192 is at the retracted position. FIG. 8 illustrates a cross section taken along a plane indicated by a line K-K in FIG. 5B. As illustrated in FIG. 8, in the state where the lever 27 is pushed, the bottom surface 27*d* of the leading end portion 27*a* comes into contact with an upper end portion of the lever receiving portion 26*c* in a Z-direction to regulate counterclockwise rotation of the separating gear 26 when viewed in the +Y-direction. In other words, the lever 27 is configured to come into contact with the separating gear 26 in the second (counterclockwise) direction in a state after a user operation for moving the blade 192 from the contact position to the retracted position is performed. Each of the lever 27 and the separating gear 26 thus configured is an example of the regulating member that regulates the rotation of the separating gear 26 in the second direction after the movement of the blade 192 from the contact position to the retracted position. This improves the stability of the blade 192 at the retracted position. In addition, the protruded portion 27*b* of the lever 27 is engaged with the groove portion 191*a* of the frame body 191 to regulate movement of the lever 27 in a +Z-direction (see also FIG. 4B). Moreover, the frame body 191 is placed in the vicinity of the rear door 60 of the image forming apparatus 1 (see FIG. 2), while the grip portion 27*c* is regulated by the rear door 60 to regulate movement of the lever 27 in the −X-direction. Due to the foregoing positional relationship, in a state where the lever 27 is pushed in the +X-direction and the blade 192 is moved to the retracted position, counterclockwise rotation of the separating gear 26 is inhibited. As described with reference to FIG. 6B, the clockwise rotation of the separating gear 26 is regulated by the small idling section H between the drive transmission pin 20 and the drive gear 21 after the movement of the blade 192 to the retracted position. Thus, the state where the lever 27 is pushed in the +X-direction and the blade 192 is moved to the retracted position is stably held with respect to the rotation of the separating gear 26 in the both directions.

Improvement of Accuracy of Blade Moving Mechanism

Figure 9A:
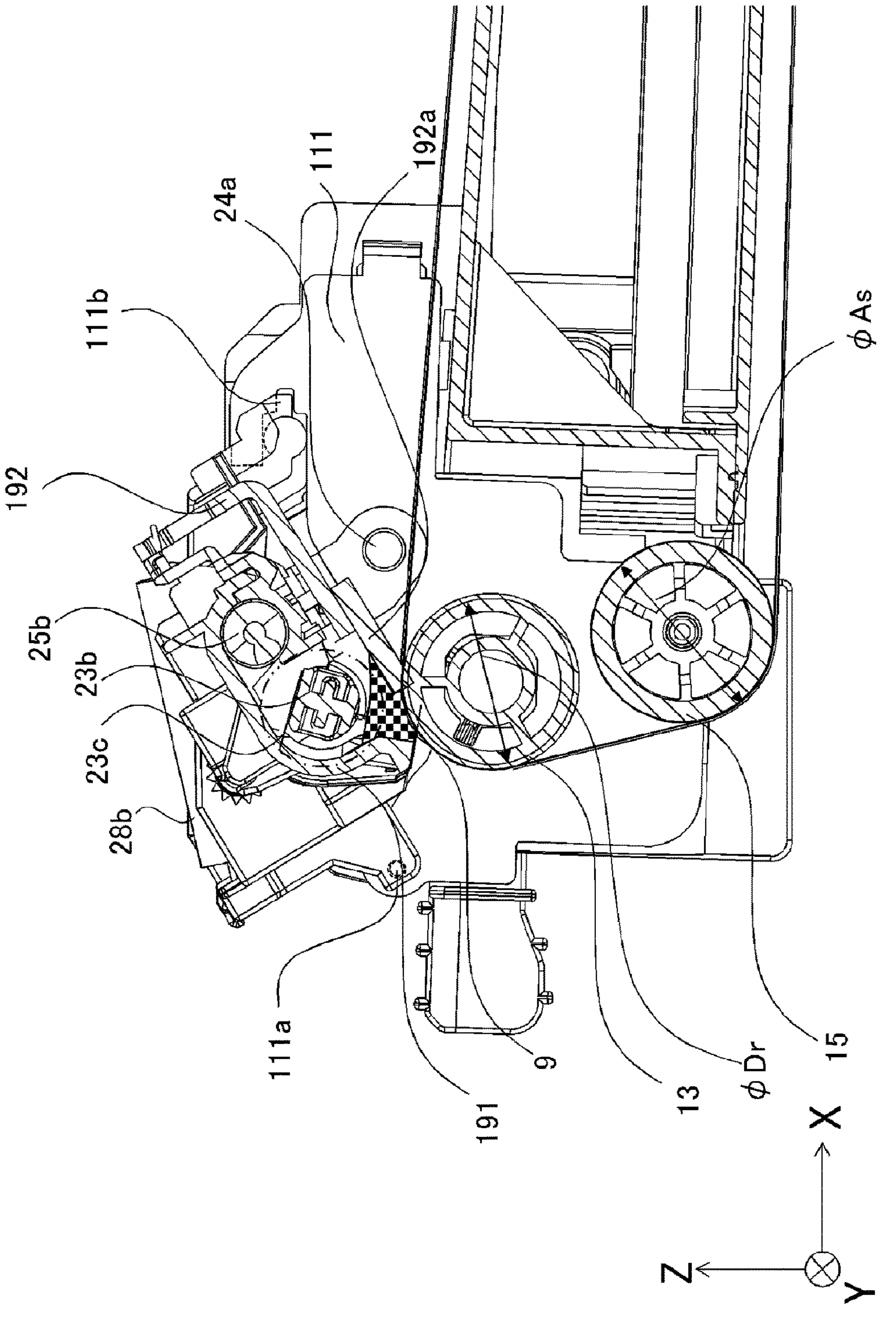
FIG. 9A is a cross-sectional view illustrating the configuration around the blade in the first embodiment.
Figure 9B:
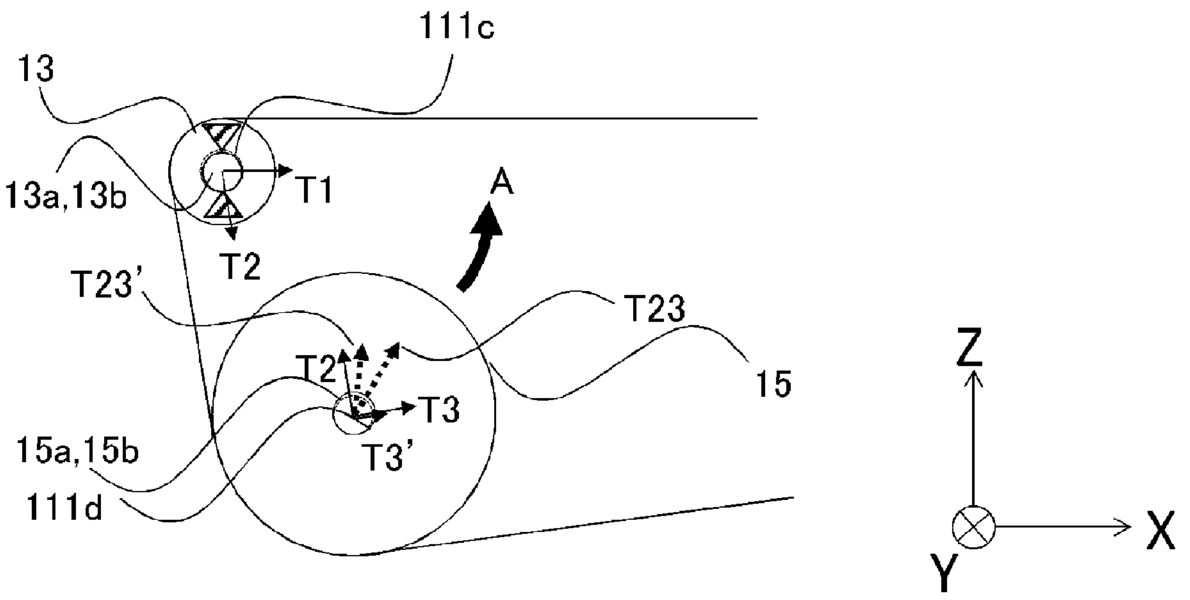
FIGS. 9B and 9C are cross-sectional views illustrating the configuration around the blade in the first embodiment.
Figure 9C:
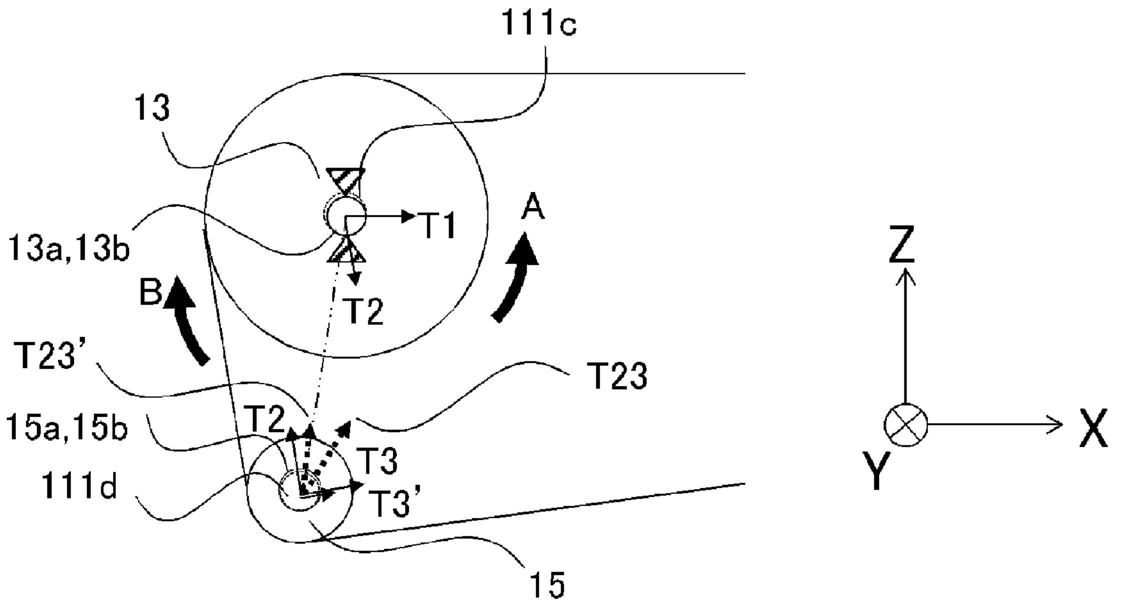

FIGS. 9A to 9C are diagrams illustrating a configuration around the blade. Each of FIGS. 9A to 9C illustrates a cross section taken along a plane indicated by a line A-A in FIG. 3A. The blade 192 is supported to be rotatable with respect to the blade shaft 24*a* provided in a transfer frame body 111 serving as a frame body included in a transfer means 11, and receives a force in the −X-direction under the tensile forces of the blade springs 28. Meanwhile, the frame body 191 is supported around a hole 111*a* provided as a rotation center in the transfer frame body 111, while being positioned with respect to the transfer frame body 111 by a groove 111*b* serving as a rotation stopper. Since the frame body 191 also receives the tensile forces of the blade springs 28, the frame body 191 is positioned with respect to the transfer frame body 111 so as to come to a dead end in the +X-direction in the hole 111*a* and come to a dead end in a −Z-direction in the groove 111*b*. Thus, the blade 192 and the frame body 191 are positioned with respect to the transfer frame body 111 by the blade springs 28 stretched therebetween. In addition, at the retracted position of the blade 192, the blade 192 and the frame body 191 are supported directly by the separating gear 26 provided between the two members, i.e., the blade 192 and the frame body 191 to be thereby positioned at the retracted position of the blade 192. This can reduce variation of an amount of movement of the blade 192 between the retracted position and the contact position and accurately move the blade 192 to the objective retracted position.

In this configuration, the driver roller 13 is configured to have an outer diameter smaller than an outer diameter of an assist roller 15. When a configuration from the surface of the intermediate transfer belt 12 to the separating gear 26 is the same, as a radius of the driver roller 13 is smaller, a distance from a center of the driver roller 13 to a center of the separating gear 26 is shorter. Accordingly, by reducing the outer diameter of the driver roller 13, it is possible to reduce sizes of components of the drive transmission mechanism described above that automatically moves the blade 192 at the retracted position to the contact position when the use of the image forming apparatus 1 is started, such as the gears. This contributes to a cost reduction resulting from simplification.

In addition, to improve the stability of the retracted position of the blade 192, the outer diameter (ϕDr) of the driver roller 13 is preferably smaller than the outer diameter (ϕAs) of the assist roller 15. Details thereof are illustrated in FIG. 9B. FIG. 9B illustrates a situation satisfying ϕDr<ϕAs, and both-end shafts of the driver roller 13 are denoted by 13*a* and 13*b*, while holes in both ends of the assist roller 15 are denoted by 15*a* and 15*b*. Unlike the driver roller 13, the assist roller 15 is configured such that a shaft member provided at a position serving as a rotation center 111*d* of the transfer frame body 111 is rotatably supported by a hole provided on the assist roller 15 side. The both-end shafts 13*a* and 13*b* of the driver roller 13 are rotatably supported by a hole 111*c* provided in the transfer frame body 111. Note that the transfer means 11 is rotatably supported by a side plate of the main body via bearings of the both-end shafts 13*a* and 13*b* of the driver roller 13.

It is assumed that a belt tensional force from the driver roller 13 to the tension roller 17 (see FIG. 2) is denoted by T1, a belt tensional force between the driver roller 13 and the assist roller 15 is denoted by T2, and a belt tensional force from the assist roller 15 to the tension roller 17 is denoted by T3. The individual tensional forces are respectively exerted on the shafts 13*a* and 13*b* of the driver roller 13, the hole 111*c* and the shaft 111*d* of the transfer frame body 111, and the holes 15*a* and 15*b* of the assist roller 15. When consideration is given to a moment exerted on the transfer frame body 111 around the both-end shafts 13*a* and 13*b* of the driver roller 13 supported on the side plate that serve as a rotation center, a resultant force T23 of the tensional forces of the assist roller 15 serves as a counterclockwise moment indicated by an arrow A. A case (T3') is assumed herein where, when the belt tensional forces T2 and T3 vary due to an impact during transportation or the like, T3 decreases under an impact in, e.g., the −X-direction. In this case, similarly to the moment resulting from the resultant force T23 of the tensional forces T2 and T3, a moment resulting from a resultant force T23' of tensional forces T2 and T3' is exerted counterclockwise as indicated by the arrow A with respect to the shafts 13*a* and 13*b* used as the rotation center. Consequently, directions in which the shafts 13*a* and 13*b* of the driver roller 13 are biased in backlash or play do not vary with respect to the hole 111*c* of the transfer frame body 111. As a result, a positional relationship between the blade 192 having the rotation center (blade shaft 24*a*) provided in the transfer frame body 111 and the driver roller 13 remains unchanged, and the stability of the blade 192 at the retracted position is high against the action of an external force exerted during transportation or the like.

On the other hand, FIG. 9C illustrates a situation satisfying ϕDr>ϕAs. The moment resulting from the resultant force T23 of the tensional forces of the assist roller 15 is exerted counterclockwise indicated by the arrow A around the both-end shafts 13*a* and 13*b* of the driver roller 13 supported on the side plate that serve as the rotation center. Meanwhile, the case (T3') is assumed where, when the belt tensional forces T2 and T3 vary due to an impact during transportation or the like, T3 decreases under the impact in the, e.g., −X-direction. In this case, the moment resulting from the resultant force T23' of the tensional forces T2 and T3' is exerted clockwise as indicated by the arrow B around the shafts 13*a* and 13*b* of the driver roller 13 that serve as the rotation center. Consequently, the directions in which the shafts 13*a* and 13*b* of the driver roller 13 are biased in backlash and play vary with respect to the hole 111*c* of the transfer frame body 111. As a result, the positional relationship between the blade 192 having the rotation center (the blade shaft 24*a*) provided in the transfer frame body 111 and the driver roller 13 may vary. Then, an amount of movement between the contact position and the retracted position may vary to degrade the stability of the blade 192 at the retracted position against the action of an external force exerted during transportation or the like.

Improvement of Blade Movement Accuracy Due to T2 Separating Portion Configuration In addition, as a drive connecting configuration to the transfer means 11, a drive connection to a T2 separating portion is provided in conjunction with a drive connection to the driver roller 13 to increase portions supporting the transfer means 11, improve stability during transportation, and increase the stability of the blade 192 at the retracted position. Details thereof are illustrated in FIGS. 5A, 5B, 6A to 6C, and 7A to 7C.

As illustrated in FIG. 5A, the transfer means 11 is connected to a main-body-side drive source via the shaft 13*a* of the driver roller 13 provided on the drive side, while being connected to a main-body-side fixing drive source (not shown) via a T2 separating input gear 34 provided on the non-drive side. As illustrated in FIG. 6B, the T2 separating input gear 34 connected to the gear train from the fixing drive source has a coupling shape, and is in a phase in which the coupling shape faces the X-direction during transportation. At this time, coupling surfaces 34*a* of the T2 separating input gear 34 are located vertically in the Z-direction and accordingly, even when an external force in the Z-direction is exerted on the apparatus main body, the transfer means 11 is held. The transfer means 11 is positioned in the Z-direction with respect to a main-body-side plate in the vicinity of the tension roller 17 around the drive-side and non-drive-side shafts 13*a* and 13*b* of the driver roller 13 that serve as the rotation center. In the present embodiment, the movement in the Z-direction is further regulated by the T2 separating input gear 34 located between the driver roller 13 and the tension roller 17 in the X-direction. Thus, it is possible to inhibit movement and deformation of the transfer means 11 against the action of an external force exerted during transportation. In the Y-direction, the T2 separating input gear 34 is provided on the non-drive side, similarly to the separating gear 26, and the blade moving mechanism and the T2 separating input gear 34 that regulates the movement of the transfer means 11 are close to each other. In the X-direction, the rotation center (the blade shaft 24*a*) of the blade 192 is provided between the non-drive-side shaft 13*b* of the driver roller 13 and the T2 separating input gear 34. This reduces displacement of the blade 192 due to the deformation, rotation, or the like of the transfer means 11, and the stability of the blade moving mechanism is high.

Note that, downstream of the T2 separating input gear 34, as illustrated in FIG. 7B, a mechanism is provided such that a T2 separating idler gear 35 is provided, a T2 separating cam gear 36 is provided coaxially with the driver roller 13, and the secondary transfer roller 14 is brought into contact and moved away by using the phase of the T2 separating cam gear 36. Note that the gear phase is sensed by a sensor (not shown) provided in a middle of the fixing gear train.

Modification of Blade Moving Mechanism

Figure 10A:
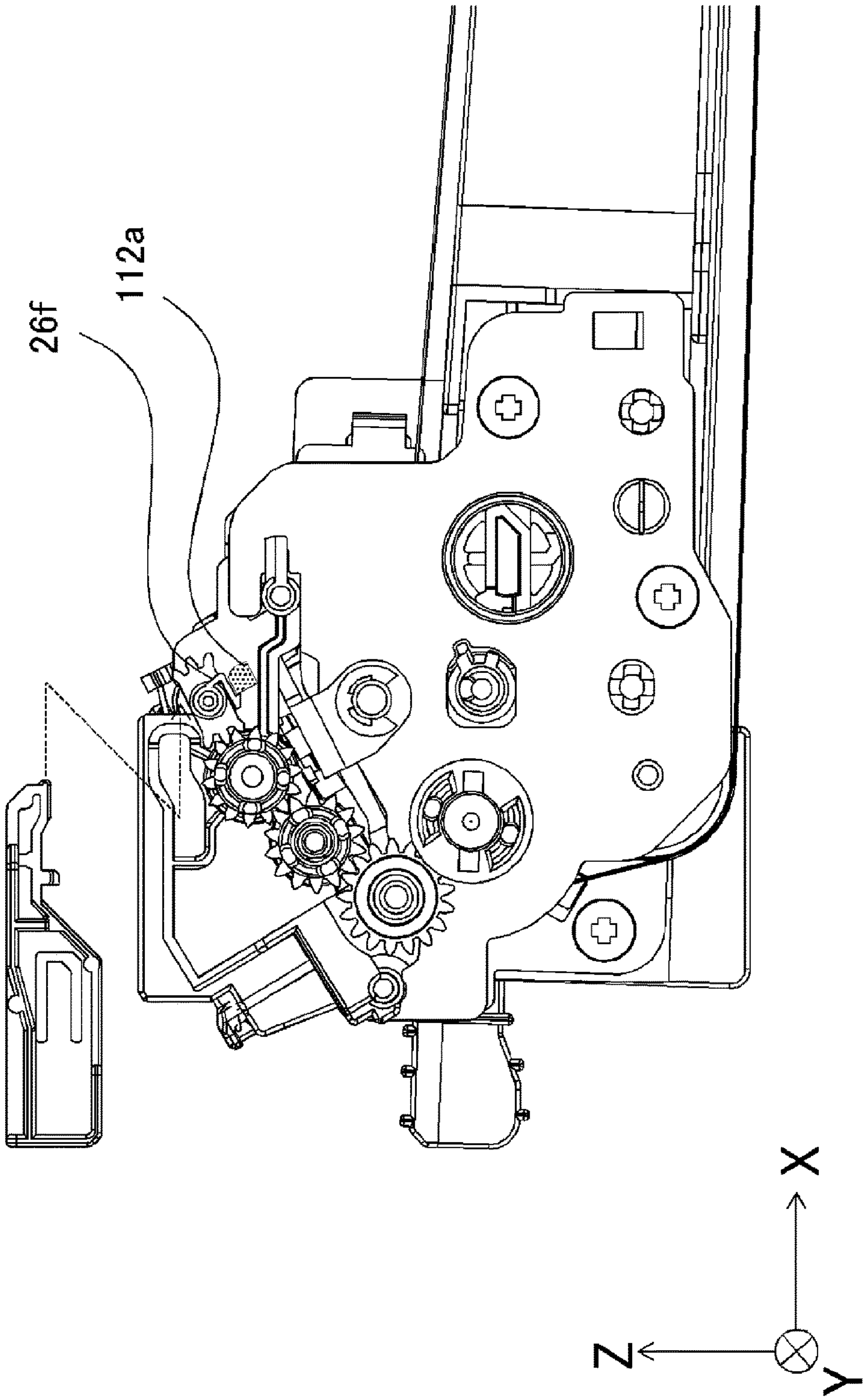
FIG. 10A is a side view illustrating a modification of the lever in the first embodiment.

Next, a description will be given of a modification of the blade moving mechanism in the present embodiment with reference to FIGS. 10A, 10B, and 11. As illustrated in FIG. 10A, the lever 27 may also be configured to be detachable from the image forming apparatus 1. In this case, it becomes possible that, e.g., after the lever 27 is operated in a step before shipment from a factory to move the blade 192 to the retracted position, shipment is performed in a state where the lever 27 is unattached to the image forming apparatus 1. This can reduce the number of components of the image forming apparatus 1. In addition, since the blade 192 is inhibited from moving from the retracted position to the contact position by an erroneous operation by a company selling the image forming apparatus 1 after the shipment from the factory or an end user, the stability of the blade 192 at the retracted position improves. In this case, after the blade 192 is moved to the retracted position by a lever operation, the lever 27 is detached, and consequently the counterclockwise rotation of the separating gear 26 described with FIG. 8 is not regulated. Accordingly, as illustrated in FIG. 10A, it may also be possible to provide the separating gear 26 with a hook 26*f* corresponding to a projecting portion, and provide the cover 112 with an engagement portion 112*a* to be engaged with the hook 26*f* after the movement of the blade 192 from the contact position to the retracted position. This can inhibit the blade 192 from unintentionally moving from the retracted position to the contact position, and improves the stability of the blade 192 at the retracted position. Each of the hook 26*f* and the engagement portion 112*a* thus configured is an example of the regulating member that regulates the rotation of the separating gear 26 in the second (counterclockwise) direction after the movement of the blade 192 from the contact position to the retracted position.

Figure 10B:
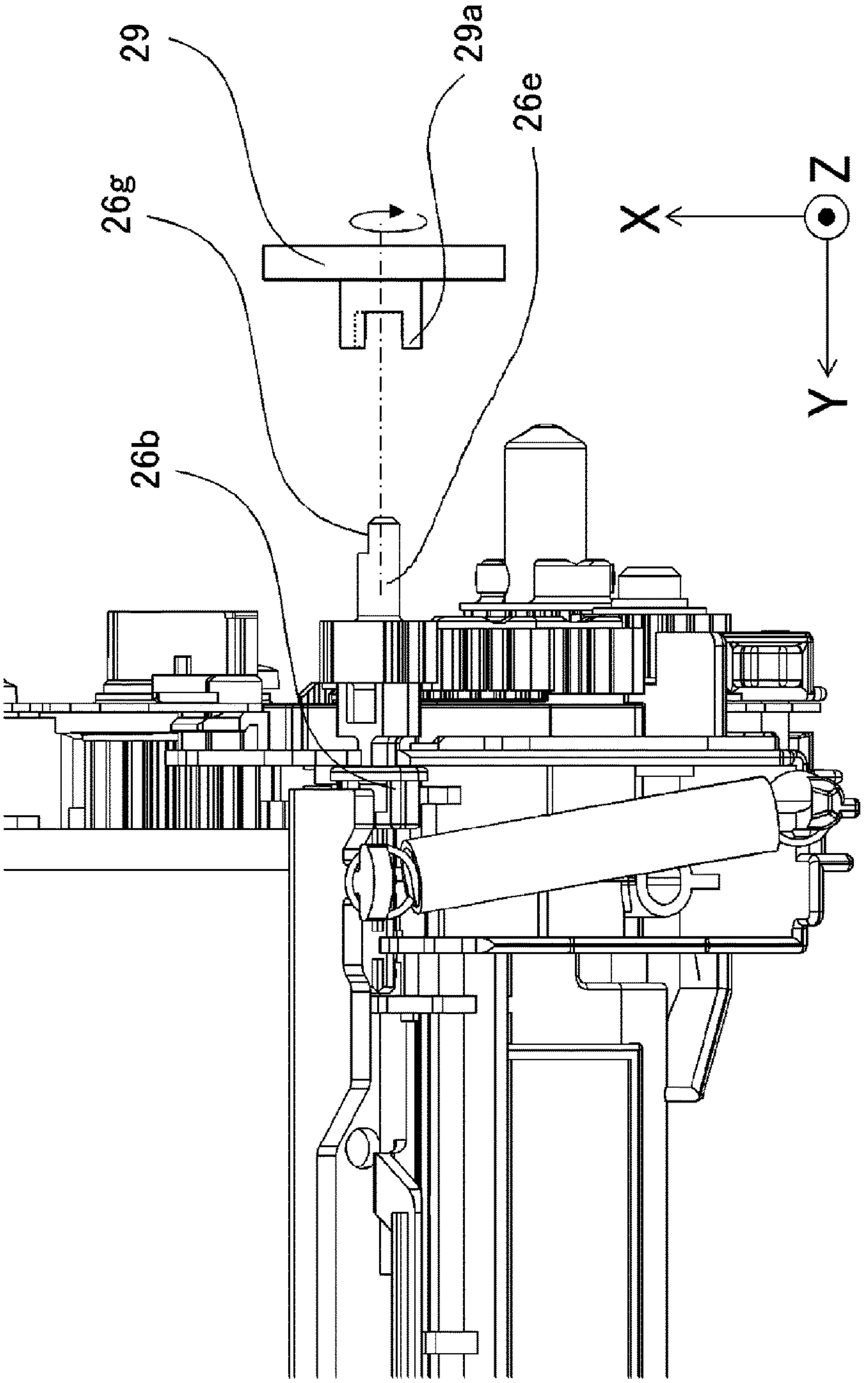
FIG. 10B is a top view illustrating the modification of the lever in the first embodiment.

As illustrated in FIG. 10B, it may also be possible to provide a leading end portion of the supporting portion 26*e* of the separating gear 26 with an operated portion 26*g* formed by forming a part of an outer peripheral surface into a planar shape and configure the separating gear 26 such that the separating gear 26 can be rotated by a rotating operation member 29 having an engagement portion 29*a* to be engaged with the operated portion 26*g*. Due to this configuration, by engaging the engagement portion 29*a* of the rotating operation member 29 with the operated portion 26*g* and performing an operation of rotating the rotating operation member 29, it is possible to rotate the separating gear 26 and move the blade 192 between the contact position and the retracted position. Due to this configuration, the lever 27 need not be provided above the separating gear 26, and therefore it is possible to contribute to a reduction in the size of the image forming apparatus 1 in the Z-direction and enable space saving of the main body. In addition, since the lever 27 is no longer needed, the members placed above the transfer means 11 can be placed at positions lower than those in a configuration including the lever 27 in the Z-direction. Such placement of the members inhibits an unplanned access made by the end user to the separating portion 26*b* and leads to prevention of an erroneous operation. Moreover, by detachably configuring the rotating operation member 29, it is possible to inhibit the blade 192 from being unintentionally moved from the retracted position to the contact position by an erroneous operation in the same manner as in the case of FIG. 10A described previously and improve the stability of the blade 192 at the retracted position. Furthermore, in the same manner as in FIG. 10A, in order to regulate the rotation of the separating gear 26 in the counterclockwise direction, in the configuration in FIG. 10B also, the hook 26*f* and the engagement portion 112*a* may also be provided in the same manner as in the configuration in FIG. 10A.

Figure 11:
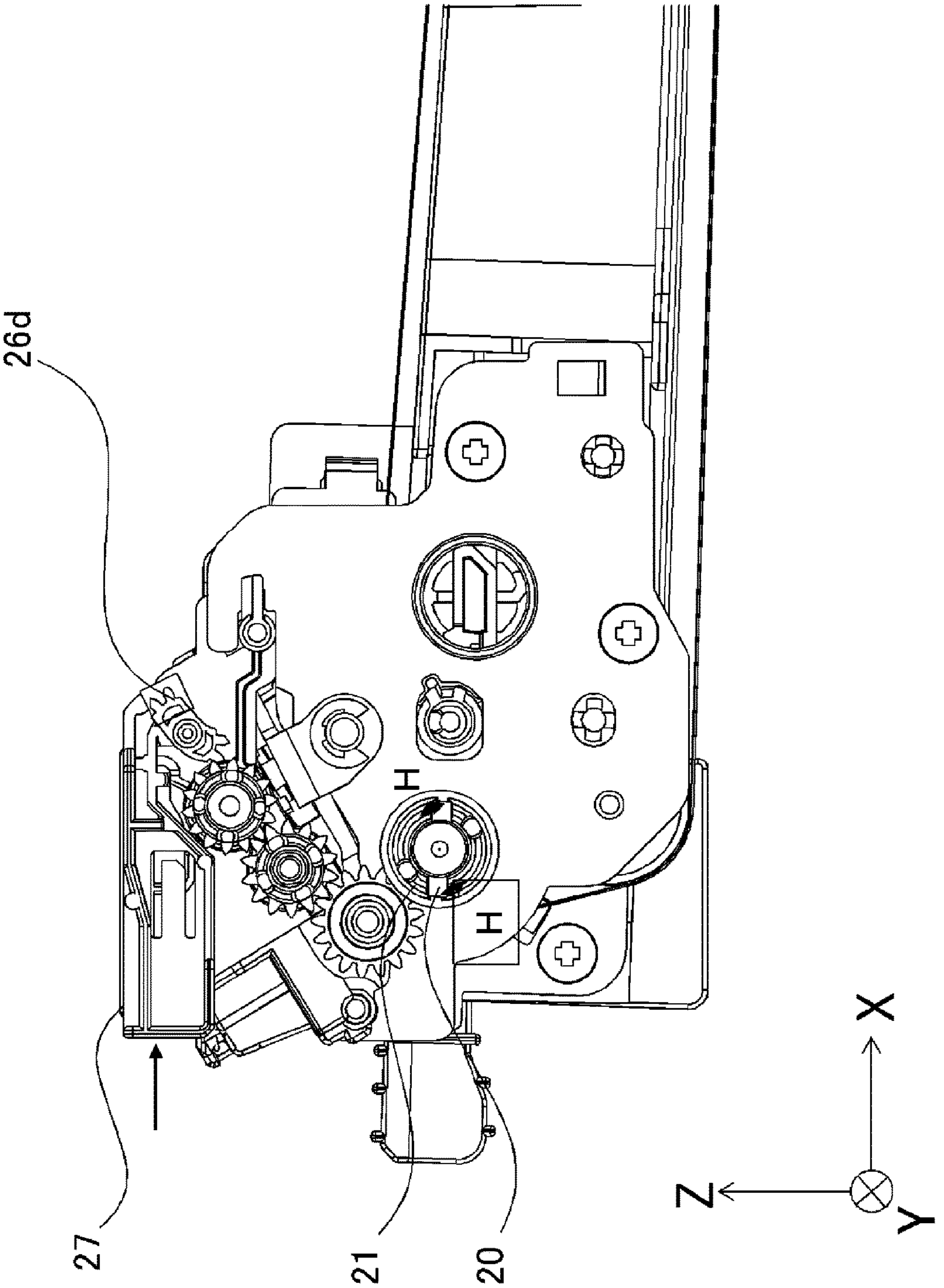
FIG. 11 is a side view illustrating a modification of the blade moving mechanism in the first embodiment.

Alternatively, as illustrated in FIG. 11, the gear portion 26*d* of the separating gear 26 can also be formed of an elastic member. FIG. 11 illustrates a state where an operation of pushing the lever 27 in the +X-direction is performed to clockwise rotate the separating gear 26 and move the blade 192 from the contact position to the retracted position. At this time, in a case where the gear portion 26*d* is a rigid body, when the teeth of the gear portion 26*d* is engaged with the screw gear 25*a* and the separating gear 26 is clockwise rotated by operating the lever 27, the rotation is transmitted to the drive gear 21 via the drive transmission mechanism. Then, the drive gear 21 is rotated in the direction B (see FIG. 6B). To allow the rotation (idling) of the drive gear 21, as described above, the idling section H is set for the drive gear 21 (see FIG. 6A). Meanwhile, in a case where the gear portion 26*d* is a flexible member, when some of the teeth of the gear portion 26*d* are engaged with the screw gear 25*a* and the separating gear 26 is clockwise rotated by operating the lever 27, the gear portion 26*d* is deformed to receive this rotating force. Consequently, the rotating force is not transmitted to the drive transmission mechanism, and therefore it is no longer necessary to provide the idling section H for allowing the rotation (idling) of the drive gear 21 between the drive gear 21 and the drive transmission pin 20. As described with FIG. 6B, it is necessary to set the idling section H such that the idling section H' at a certain angle remains in consideration of component variation or the like, though the angle is smaller than the angle required to further move, to the contact position, the blade 192 after being moved from the contact position to the retracted position. In this regard, when the gear portion 26*d* is configured to be flexible, the idling section H at the contact position is no longer needed, and accordingly the separating gear 26 is more reliably locked in the clockwise direction to improve the stability of the blade 192 at the retracted position. In the drive transmission mechanism thus configured, the separating gear 26 serving as the rotating member has a flexible gear connected to the rotation shaft thereof, and the flexible gear is deformed. This allows the separating gear 26 to rotate in the first (clockwise) direction only by the angle required by the blade 192 to at least move from the contact position to the retracted position without involving rotation of the driver roller 13 and without involving idling of the separating gear 26 and consequently idling of the drive gear 21. As a result, the drive transmission mechanism can be set so as not to allow the separating gear 26 to idle in the first direction without involving the rotation of the rotation shaft of the driver roller 13, i.e., so as to eliminate the idling section H. The drive transmission mechanism thus set is an example of the regulating member that regulates the rotation of the separating gear 26 in the first direction after the movement of the blade 192 from the contact position to the retracted position. Note that, by the deformation of the gear portion 26*d*, a force to counterclockwise rotate the separating gear 26 is exerted thereon, but it is only needed to operate a configuration that regulates rotation, such as the lever 27 in FIG. 8 or the hook 26*f* in FIG. 10A.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-71903, filed on Apr. 25, 2022, which is hereby incorporated by reference herein in its entirety.

What is claimed is:

1. An image forming apparatus comprising:
an image bearing member that bears a developer image;
a transfer belt to which the developer image is transferred from the image bearing member;
a blade that comes into contact with the transfer belt to collect a developer remaining on the transfer belt;
a rotating gear that rotates to act on the blade and moves the blade between a contact position, where the blade contacts the transfer belt, and a retracted position, where the blade is away from the transfer belt; and
a movement regulating member that regulates movement of the blade, which has moved from the contact position to the retracted position, from the retracted position to the contact position,
wherein the movement regulating member includes a lever with which a user operation for exerting a force on the rotating gear and rotating the rotating gear can be performed, and
wherein the lever is separate from the rotating gear and unconnected to the rotating gear.

2. The image forming apparatus according to claim 1, wherein the blade is configured to move from the contact position to the retracted position as a result of rotation of the rotating gear in a first direction and move from the retracted position to the contact position as a result of further rotation of the rotating gear in the first direction or rotation of the rotating gear in a second direction, which is an opposite direction to the first direction, and
wherein the movement regulating member regulates the rotation of the rotating gear in the first direction after the movement of the blade from the contact position to the retracted position.

3. The image forming apparatus according to claim 2, further comprising:
a stretching roller that stretches the transfer belt; and
a drive transmission mechanism that connects a rotation shaft of the stretching roller and a rotation shaft of the rotating gear so as to allow a rotating force to be transmitted therebetween,
wherein the drive transmission mechanism is configured to allow the rotating gear to idle in the first direction by an angle which is necessary for the blade to move at least from the contact position to the retracted position without involving rotation of the rotation shaft of the stretching roller.

4. The image forming apparatus according to claim 2, further comprising:
a stretching roller that stretches the transfer belt; and
a drive transmission mechanism that connects a rotation shaft of the stretching roller and a rotation shaft of the rotating gear so as to allow a rotating force to be transmitted therebetween, wherein the drive transmission mechanism has a flexible gear connected to the rotation shaft of the rotating gear, and is configured such that, due to deformation of the flexible gear, the rotating gear rotates in the first direction by an angle which is necessary for the blade to move at least from the contact position to the retracted position without involving rotation of the rotation shaft of the stretching roller and without involving idling of the rotating gear.

5. The image forming apparatus according to claim 4, wherein the drive transmission mechanism is configured so as not to allow the rotating gear to idle in the first direction without involving the rotation of the rotation shaft of the stretching roller, and wherein the regulating gear regulates the rotation of the rotating gear in the first direction by means of the drive transmission mechanism thus configured.

6. The image forming apparatus according to claim 3, wherein, when a drive force to rotate the stretching roller is input in a state where the blade is at the retracted position, the drive force is transmitted by the drive transmission mechanism to the rotating gear to rotate the rotating gear in the first direction and move the blade from the retracted position to the contact position.

7. The image forming apparatus according to claim 1, wherein the lever is detachable from the image forming apparatus.

8. The image forming apparatus according to claim 1, wherein the blade is configured to move from the contact position to the retracted position as a result of rotation of the rotating gear in a first direction and move from the retracted position to the contact position as a result of further rotation of the rotating gear in the first direction or rotation of the rotating gear in a second direction, which is an opposite direction to the first direction, and wherein the movement regulating member regulates the rotation of the rotating gear in the second direction after the movement of the blade from the contact position to the retracted position.

9. The image forming apparatus according to claim 8, further comprising an lever with which a user operation for exerting a force on the rotating gear and rotating the rotating gear can be performed, wherein the lever is separate from the rotating gear and unconnected to the rotating gear.

10. The image forming apparatus according to claim 9, wherein the lever is detachable from the image forming apparatus.

11. The image forming apparatus according to claim 9, wherein the lever is configured to be brought into contact with the rotating gear by a user operation in a direction along the first direction so as to exert a force to rotate the rotating gear in the first direction and be moved away from the rotating gear by a user operation in a direction along the second direction so as not to exert the force on the rotating gear, and wherein the movement regulating member regulates the rotation of the rotating gear in the second direction by means of the lever thus configured.

12. The image forming apparatus according to claim 9, wherein the lever is configured to come into contact with the rotating gear in the second direction in a state after a user operation for moving the blade from the contact position to the retracted position is performed, and wherein the movement regulating member regulates the rotation of the rotating gear in the second direction by means of each of the lever thus configured and the rotating gear.

13. The image forming apparatus according to claim 8, wherein the rotating gear has a hook, the image forming apparatus further comprising an engagement structure to be engaged with the hook of the rotating gear after the movement of the blade from the contact position to the retracted position, wherein the movement regulating member regulates the rotation of the rotating gear in the second direction by means of each of the hook and the engagement portion structure.

14. The image forming apparatus according to claim 8, further comprising:

a stretching roller that stretches the transfer belt; and a drive transmission mechanism that connects a rotation shaft of the stretching roller and a rotation shaft of the rotating gear so as to allow a rotating force to be transmitted therebetween, wherein, when a drive force to rotate the stretching roller is input in a state where the blade is at the retracted position, the drive force is transmitted by the drive transmission mechanism to the rotating gear to rotate the rotating gear in the first direction and move the blade from the retracted position to the contact position.

15. An image forming apparatus comprising:

an image bearing member that bears a developer image;

a transfer belt to which the developer image is transferred from the image bearing member;

a blade that comes into contact with the transfer belt to collect a developer remaining on the transfer belt;

a rotating gear that rotates to act on the blade and moves the blade between a contact position, where the blade contacts the transfer belt, and a retracted position, where the blade is away from the transfer belt;

a movement regulating member that regulates movement of the blade, which has moved from the contact position to the retracted position, from the retracted position to the contact position;

a stretching roller that stretches the transfer belt; and a drive transmission mechanism that connects a rotation shaft of the stretching roller and a rotation shaft of the rotating gear so as to allow a rotating force to be transmitted therebetween, wherein the blade is configured to move from the contact position to the retracted position as a result of rotation of the rotating gear in a first direction and move from the retracted position to the contact position as a result of further rotation of the rotating gear in the first direction, wherein the movement regulating member regulates the rotation of the rotating gear in the first direction after the movement of the blade from the contact position to the retracted position, wherein the drive transmission mechanism is configured to allow the rotating gear to idle in the first direction by an angle which is necessary for the blade to move at least from the contact position to the retracted position without involving rotation of the rotation shaft of the stretching roller, wherein the drive transmission mechanism is configured such that an angle by which the rotating gear can further idle in the first direction without involving the rotation of the rotation shaft of the stretching roller after the movement of the blade from the contact position to the retracted position is smaller than an angle of the rotation of the rotating gear in the first direction that is necessary for the blade to move from the retracted position to the contact position, and wherein the movement regulating member regulates the rotation of the rotating gear in the first direction by means of the drive transmission mechanism thus configured.

* * * * *